(12) United States Patent
McCorkle et al.

(10) Patent No.: US 6,700,939 B1
(45) Date of Patent: Mar. 2, 2004

(54) ULTRA WIDE BANDWIDTH SPREAD-SPECTRUM COMMUNICATIONS SYSTEM

(75) Inventors: John W. McCorkle, Vienna, VA (US); Martin Rofheart, Washington, DC (US)

(73) Assignee: Xtremespectrum, Inc., Greenbelt, MD (US)

( * ) Notice: Subject to any disclaimer, the term of this patent is extended or adjusted under 35 U.S.C. 154(b) by 0 days.

(21) Appl. No.: 09/209,460

(22) Filed: Dec. 11, 1998

Related U.S. Application Data
(60) Provisional application No. 60/069,594, filed on Dec. 12, 1997.

(51) Int. Cl.[7] .............................................. H04L 27/04
(52) U.S. Cl. ....................... 375/295; 375/130; 375/140; 375/146; 370/324
(58) Field of Search ................................. 375/130, 131, 375/140, 146, 147, 149, 295; 370/213, 324

(56) References Cited

U.S. PATENT DOCUMENTS

| | | |
|---|---|---|
| 2,671,896 A | 3/1954 | De Rosa |
| 2,999,128 A | 9/1961 | Hoeppner |
| 3,587,107 A | 6/1971 | Ross |

(List continued on next page.)

FOREIGN PATENT DOCUMENTS

| | | |
|---|---|---|
| WO | WO01/73965 | 10/2001 |

OTHER PUBLICATIONS

"Energy Capture vs. Correlator Resources in Ultra–Wide Bandwidth Indoor Wireless Communications Channels," by Moe Z. Win and Robert A. Scholtz, IEEE, Jun. 1997, pp. 1277–1281.

"Ultra–Wide Bandwldth Tlme–Hopping Spread–Spectrum Impulse Radio for Wlreless Multiple–Access Communications," by Moe Z. Win and Robert A. Scholtz, IEEE Transactions on Communicatlons, vol. 48, No. 4, Apr. 2000, pp. 679–691.

"Low–Power, Miniature, Distributed Position Location and Communlcation Devices Using Ultra–Wldeband Nonsinusoldal Communication Technology," Seml–Annual Technical Report Contract J–FBI–94–058, Aether Wire & Location, Inc., Jul. 1995.

(List continued on next page.)

*Primary Examiner*—Shuwang Liu
(74) *Attorney, Agent, or Firm*—McDermott, Will & Emery

(57) ABSTRACT

An ultra wide bandwidth, high speed, spread spectrum communications system uses short wavelets of electromagnetic energy to transmit information through objects such as walls or earth. The communication system uses baseband codes formed from time shifted and inverted wavelets to encode data on a RF signal. Typical wavelet pulse durations are on the order of 100 to 1000 picoseconds with a bandwidth of approximately 8 GHz to 1 GHz, respectively. The combination of short duration wavelets and encoding techniques are used to spread the signal energy over an ultra wide frequency band such that the energy is not concentrated in any particular narrow band (e.g. VHF: 30–300 MHz or UHF: 300–1000 MHz) and is not detected by conventional narrow band receivers so it does not interfere with those communication systems. The use of pulse codes composed of time shifted and inverted wavelets gives the system according to the present invention has a spatial resolution on the order of 1 foot which is sufficient to minimize the negative effects of multipath interference and permit time domain rake processing.

30 Claims, 31 Drawing Sheets

U.S. PATENT DOCUMENTS

| | | |
|---|---|---|
| 3,612,899 A | 10/1971 | Ross |
| 3,659,203 A | 4/1972 | Ross et al. |
| 3,662,316 A | 5/1972 | Robbins et al. |
| 3,668,639 A | 6/1972 | Harmuth |
| 3,678,204 A | 7/1972 | Harmuth |
| 3,705,981 A | 12/1972 | Harmuth |
| 3,728,632 A | 4/1973 | Ross |
| 3,739,392 A | 6/1973 | Ross et al. |
| 3,772,697 A | 11/1973 | Ross |
| 3,794,996 A | 2/1974 | Robbins et al. |
| 3,806,795 A | 4/1974 | Morey |
| 3,878,749 A | 4/1975 | Woron |
| 3,934,252 A | 1/1976 | Ross et al. |
| 3,995,212 A | 11/1976 | Ross |
| 4,017,854 A | 4/1977 | Ross |
| 4,072,942 A | 2/1978 | Alongi |
| 4,099,118 A | 7/1978 | Franklin et al. |
| 4,152,701 A | 5/1979 | Mara et al. |
| 4,254,418 A | 3/1981 | Cronson et al. |
| 4,344,705 A | 8/1982 | Kompa et al. |
| 4,473,906 A | 9/1984 | Warnaka et al. |
| 4,506,267 A | 3/1985 | Harmuth |
| 4,641,317 A | 2/1987 | Fullerton |
| 4,651,152 A | 3/1987 | Harmuth |
| 4,688,041 A | 8/1987 | Cronson et al. |
| 4,695,752 A | 9/1987 | Ross et al. |
| 4,698,633 A | 10/1987 | Lamensdorf et al. |
| 4,743,906 A | 5/1988 | Fullerton |
| 4,751,515 A | 6/1988 | Corum |
| 4,813,057 A | 3/1989 | Fullerton |
| 4,862,174 A | 8/1989 | Niato et al. |
| 4,907,001 A | 3/1990 | Harmuth |
| 4,979,186 A | 12/1990 | Fullerton |
| 5,057,846 A | 10/1991 | Harmuth |
| 5,090,024 A | 2/1992 | Vander Mey et al. |
| 5,095,312 A | 3/1992 | Jehle et al. |
| 5,134,408 A | 7/1992 | Harmuth |
| 5,146,616 A | 9/1992 | Tang et al. |
| 5,148,174 A | 9/1992 | Harmuth |
| 5,153,595 A | 10/1992 | Harmuth |
| 5,159,343 A | 10/1992 | Harmuth |
| 5,177,486 A | 1/1993 | Kim et al. |
| 5,216,429 A | 6/1993 | Nakagawa et al. |
| 5,216,695 A | 6/1993 | Ross et al. |
| 5,223,838 A | 6/1993 | Tang et al. |
| 5,227,621 A | 7/1993 | Kim et al. |
| 5,237,586 A | 8/1993 | Bottomley |
| 5,239,309 A | 8/1993 | Tang et al. |
| 5,248,975 A | 9/1993 | Schutz |
| 5,274,271 A | 12/1993 | McEwan |
| 5,307,079 A | 4/1994 | Ross et al. |
| 5,307,081 A | 4/1994 | Harmuth |
| 5,313,056 A | 5/1994 | Kim et al. |
| 5,319,218 A | 6/1994 | Kim et al. |
| 5,323,169 A | 6/1994 | Koslover |
| 5,332,938 A | 7/1994 | McEwan |
| 5,337,054 A | 8/1994 | Ross et al. |
| 5,345,471 A | 9/1994 | McEwan |
| 5,351,053 A | 9/1994 | Wicks et al. |
| 5,352,974 A | 10/1994 | Heger |
| 5,353,301 A | 10/1994 | Mitzlaff |
| 5,359,624 A | 10/1994 | Lee et al. |
| 5,361,070 A | 11/1994 | McEwan |
| 5,363,108 A | 11/1994 | Fullerton |
| 5,365,240 A | 11/1994 | Harmuth |
| 5,377,225 A | 12/1994 | Davis |
| 5,381,151 A | 1/1995 | Boles et al. |
| 5,389,939 A | 2/1995 | Tang et al. |
| 5,422,607 A | 6/1995 | McEwan |
| 5,426,618 A | 6/1995 | Chen et al. |
| 5,455,593 A | 10/1995 | Ross |
| 5,457,394 A | 10/1995 | McEwan |
| 5,465,094 A | 11/1995 | McEwan |
| 5,471,162 A | 11/1995 | McEwan |
| 5,479,120 A | 12/1995 | McEwan |
| 5,486,833 A | 1/1996 | Barrett |
| 5,493,691 A | 2/1996 | Barrett |
| 5,495,499 A | 2/1996 | Fenton et al. |
| 5,510,800 A | 4/1996 | McEwan |
| 5,512,834 A | 4/1996 | McEwan |
| 5,517,198 A | 5/1996 | McEwan |
| 5,519,342 A | 5/1996 | McEwan |
| 5,519,400 A | 5/1996 | McEwan |
| 5,521,600 A | 5/1996 | McEwan |
| 5,523,758 A | 6/1996 | Harmuth |
| 5,523,760 A | 6/1996 | McEwan |
| 5,525,907 A * | 6/1996 | Frazier ...................... 324/239 |
| 5,526,299 A | 6/1996 | Coifman et al. |
| 5,533,046 A | 7/1996 | Lund |
| 5,543,799 A | 8/1996 | Heger |
| 5,563,605 A | 10/1996 | McEwan |
| 5,568,522 A | 10/1996 | Hershey et al. |
| 5,573,012 A | 11/1996 | McEwan |
| 5,576,627 A | 11/1996 | McEwan |
| 5,581,256 A | 12/1996 | McEwan |
| 5,583,892 A | 12/1996 | Drakul et al. |
| 5,586,145 A | 12/1996 | Morgan et al. |
| 5,589,838 A | 12/1996 | McEwan |
| 5,592,177 A | 1/1997 | Barrett |
| 5,594,456 A | 1/1997 | Norris et al. |
| 5,596,601 A | 1/1997 | Bar-David |
| 5,602,964 A | 2/1997 | Barrett |
| 5,609,059 A | 3/1997 | McEwan |
| 5,610,611 A | 3/1997 | McEwan |
| 5,610,907 A | 3/1997 | Barrett |
| 5,623,511 A | 4/1997 | Bar-David et al. |
| 5,627,856 A | 5/1997 | Durrant et al. |
| 5,630,216 A | 5/1997 | McEwan |
| 5,633,889 A | 5/1997 | Schilling |
| 5,640,419 A | 6/1997 | Janusas |
| 5,648,787 A | 7/1997 | Ogot et al. |
| 5,654,978 A | 8/1997 | Vanderpool et al. |
| 5,659,572 A | 8/1997 | Schilling |
| 5,661,385 A | 8/1997 | McEwan |
| 5,661,490 A | 8/1997 | McEwan |
| 5,673,050 A | 9/1997 | Moussally et al. |
| 5,673,286 A | 9/1997 | Lomp |
| 5,677,927 A | 10/1997 | Fullerton et al. |
| 5,682,164 A | 10/1997 | McEwan |
| 5,687,169 A * | 11/1997 | Fullerton .................... 370/324 |
| 5,748,891 A | 5/1998 | Fleming et al. |
| 5,804,921 A * | 9/1998 | McEwan et al. ............ 307/106 |
| 5,832,035 A | 11/1998 | Fullerton |
| 5,901,172 A | 5/1999 | Fontana et al. |
| 5,956,624 A | 9/1999 | Hunsinger et al. |
| 5,960,031 A * | 9/1999 | Fullerton et al. ............ 375/131 |
| 5,963,581 A * | 10/1999 | Fullerton et al. ............ 375/131 |
| 5,995,534 A * | 11/1999 | Fullerton et al. ............ 375/146 |
| 6,003,092 A | 12/1999 | Waters |
| 6,026,125 A * | 2/2000 | Larrick et al. ............... 375/295 |
| 6,031,862 A * | 2/2000 | Fullerton et al. ............ 370/213 |
| 5,361,070 A | 5/2000 | McEwan |
| 6,133,876 A * | 10/2000 | Fullerton et al. ............ 342/132 |

OTHER PUBLICATIONS

Low–Power, Miniature, Distributed Position Location and Communication Devices Using Ultra–Wideband, Nonsinusoidal Communication Technology, Advanced Research Projects Agency/Federal Bureau of Investigation, Jul. 1995, pps. 1–40.

"Energy Capture vs. Correlator Resources in Ultra–Wide Bandwidth Indoor Wireless Communications Channels," by Moe Z. Win and Robert A. Scholtz, IEEE, Jun. 1997, pp. 1277–1281.

"Ultra–Wide Bandwidth Time–Hopping Spread–Spectrum Impulse Radio for Wireless Multiple–Access Communications," by Moe Z. Win and Robert A. Scholtz, IEEE Transactions on Communications, vol. 48, No. 4, Apr. 2000, pp. 679–691.

U.S. patent application No. 09/685,201 filed Oct. 10, 2000 to McCorkle et al., entitled "Carrierless Ultra Wideband Wireless Signals for Conveying Application Data."

World's Fastest Solid–State Digitizer, Energy & Technology Review, Apr., 1994, McEwan et al, ppgs 1–6.

Radar Technology May Held Improve Automobile Safety, Tuesday's Newsline, Tuesday, Mar. 29, 1994, vol. 19., No. 22.

Single–Shot Transient Digitizer (1993), Inventor Thomas McEwan Motion Detector Technology, Inventor: Thomas McEwan.

* cited by examiner

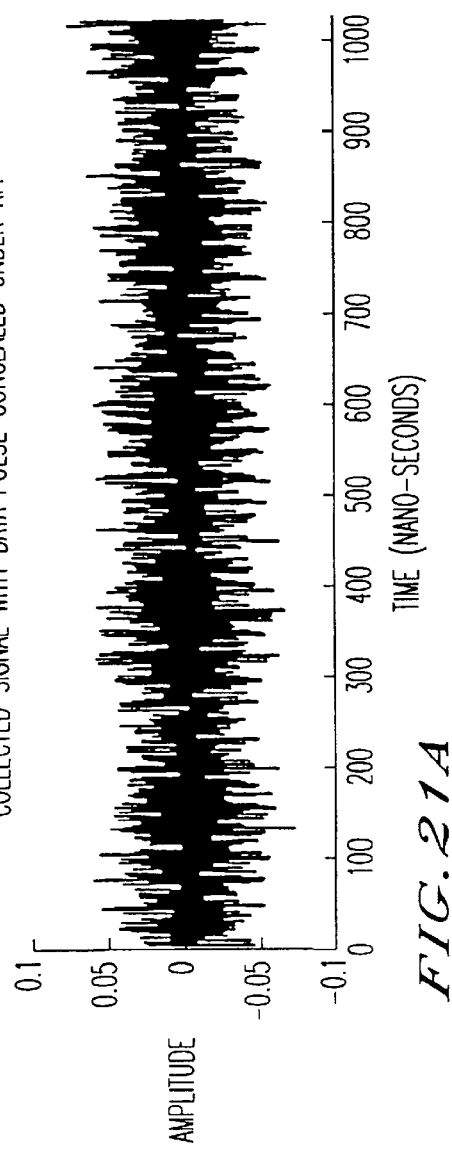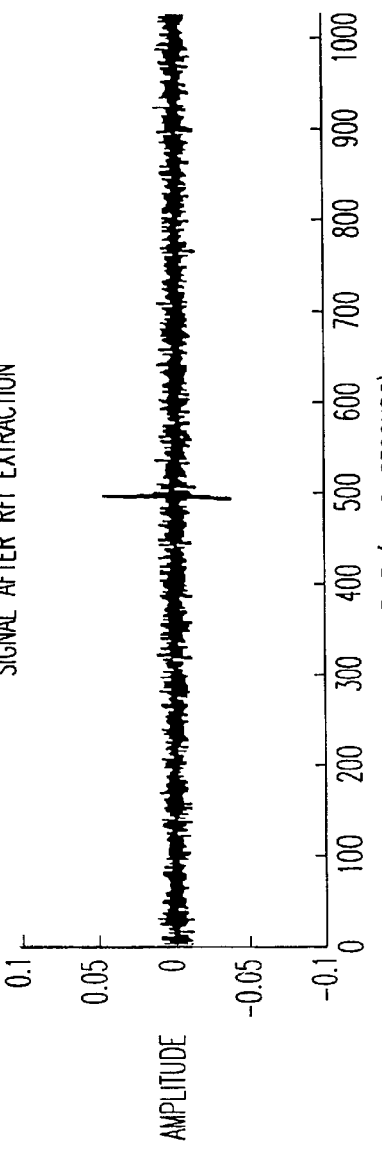

ULTRA WIDE BANDWIDTH SPREAD-SPECTRUM COMMUNICATIONS SYSTEM

CROSS-REFERENCE TO RELATED APPLICATIONS

This application was converted from U.S. provisional application serial No. 60/069,594 filed Dec. 12, 1997 which is hereby incorporated by reference in its entirety.

COPYRIGHT NOTICE

Copyright, 1998, XtremeSpectrum, Inc. A portion of the disclosure of this patent document contains material which is subject to copyright protection. The copyright owner has no objection to reproduction by anyone of the patent document or the patent disclosure, as it appears in the U.S. Patent and Trademark Office patent file or records, but otherwise reserves all copyright rights whatsoever.

STATEMENT REGARDING GOVERNMENT INTEREST

The Government of the United States of America, as represented by the Secretary of the Army, has certain non-exclusive license rights to the Invention as set forth in rights determination ARL No. 998-679-16.

STATEMENT REGARDING FEDERALLY SPONSORED RESEARCH

Not Applicable

REFERENCE TO MICROFICHE APPENDIX

Not Applicable

BACKGROUND OF THE INVENTION

1. Technical Field of the Invention

The present invention pertains to a radio communications system, particularly to a wireless digital communications system, and more particularly to an ultra wide bandwidth (UWB), spread-spectrum, wireless digital communications system.

2. Description of the Prior Art

There are numerous radio communications techniques for digital data. Most recently, wireless digital communications have been applied to mobile telephone systems, pagers, remote data collection, and wireless networking of computers as well as other applications. One of many books on the subject is "Wireless Digital Communications, Modulation & Spread Spectrum Applications," by Kamilo Feher. This book and others deal with conventional modulation of a carrier with, for example, phase or frequency shift keying (i.e. FSK, MSK, GMSK, BPSK, DBPSK, QPSK, O-QPSK, FQPSK, $\pi/4$-DEQPSK). The American and Japanese cellular standard, for example, uses $\pi/4$-DEQPSK. These systems have used either time division multiple access (TDMA) or code division multiple access (CDMA) in order to share the aggregate bandwidth between multiple users. They use either FHSS (frequency hop spread spectrum) or the CDMA codes to spread the spectrum. There remains a need, however, for higher data rates to be accommodated, with simultaneous ability to communicate through barriers such as buildings, walls, or even through soil or through tunnels. The spectrum that is capable of penetrating walls and soil (i.e. frequencies below about 3 GHz), however, is in use. Therefore, there is a need to have a communication system that can coexist in that part of the spectrum where penetration occurs. Current spread-spectrum and narrowband systems cannot coexist with other narrow bandwidth users of the same spectrum due to mutual interference. Too much interference is impinged on the other users, who themselves cause too much interference to the communication system. Typically, high-speed links operate on microwave carriers that are easily blocked by terrain and intervening objects. Prior techniques are based on modulating a carrier frequency. Such a framework assumes that all components, (e.g. the antenna) have a reasonably flat frequency response over the bandwidth used and therefore do not affect the waveform. The present invention does not. They also assume that there are several to many cycles of the carrier between transitions (e.g. zero crossings) in the modulating waveform. Again, the present invention does not. It is this fact that allows the present invention to simultaneously operate at low frequencies, yet resolve multipath, and maintain high data rates. This combination has substantial benefits be low frequencies both penetrate lossy media, and minimize reflections off objects because they become smaller relative to the wavelength. But conventional systems typically have less than 10% bandwidth, and therefore have poor resolution at low frequencies. Furthermore, in contrast to current techniques, the present invention is optimized to not only be robust to multipath, but to take advantage of it.

Other UWB systems have been based on producing and receiving short one-to two cycle impulses at a relatively low duty cycle. Examples include deRosa (U.S. Pat. No. 2,671,896), Robbins (U.S. Pat. No. 3,662,316), Morey (U.S. Pat. No. 3,806,795), Ross and Mara (U.S. Pat. No. 5,337,054), and Fullerton and Kowie (U.S. Pat. No. 5,677,927). Impulses on the order of 1 ns are emitted at a 1 to 10 MHz rate, giving rise to a 100:1 to 1000:1 duty cycle. Due to this poor duty cycle, it is difficult to impossible to generate significant average power efficiently, or in an integrated circuit, because the peak voltages are higher than breakdown voltage of state-of-the-art low voltage CMOS and Bipolar processes. The waveform used in the present invention is, instead, an essentially continuous wave. The prior-art systems also use pseudo-random time intervals between unchanging (essentially identical) pulses, for the purpose of spreading the spectrum conveying information, are used in each of these systems. By contrast, the present invention, while allowing the pulse position to be randomized, communicates information by changing the pulse shape. Yet another difference is interference. The present invention does not require pulse position modulation to make the output power spectrum smooth. Instead, the spectrum is smoothed by the modulation of the pulse shape.

SUMMARY OF INVENTION

It is an object of the present invention to construct an ultra wide bandwidth (UWB) high-speed digital communications system that directly produces short, spatially compact, electromagnetic wavelets, (or impulses, or energy packets). The wave-shape of these wavelets is tailored to propagate in free space and communicate information, for example, through use of inverted or non-inverted copies. It is an object of the present invention to communicate information by sending sequences of these impulses, where the spectrum is constrained by both the selection of the sequence coding, and the shape of the wavelet. It is also an object of the present invention to construct an UWB high-speed digital communications system that penetrates through obstructing objects (e.g. walls), or media (e.g. earth). It is also an object of the present invention to construct an UWB high-speed digital communications system that not only tolerates significant multipath, but can take advantage of it. It is also an objective of the present invention to operate in the presence of interference from other users of the same spectrum, yet with little interference to those other users. It is also an object of the present invention to provide the above objectives in a device that can be largely constructed with a large-scale semiconductor integrated-circuit (LSI).

The foregoing and other objects and advantages of the invention will appear from the following description. In the description reference is made to the accompanying drawings which form a part hereof, and in which there is shown by way of illustration and not of limitation a preferred embodiment. Such description does not represent the full extent of the invention, but rather the invention may be employed in different arrangements according to the breadth of the invention.

BRIEF DESCRIPTION OF THE DRAWINGS

FIGS. 21A–21B show a plot of the received signal before and after RFI extraction, with RFI in Alexandria Va.

BRIEF OVERVIEW OF THE PRINCIPLES OF OPERATION

Figure 1:
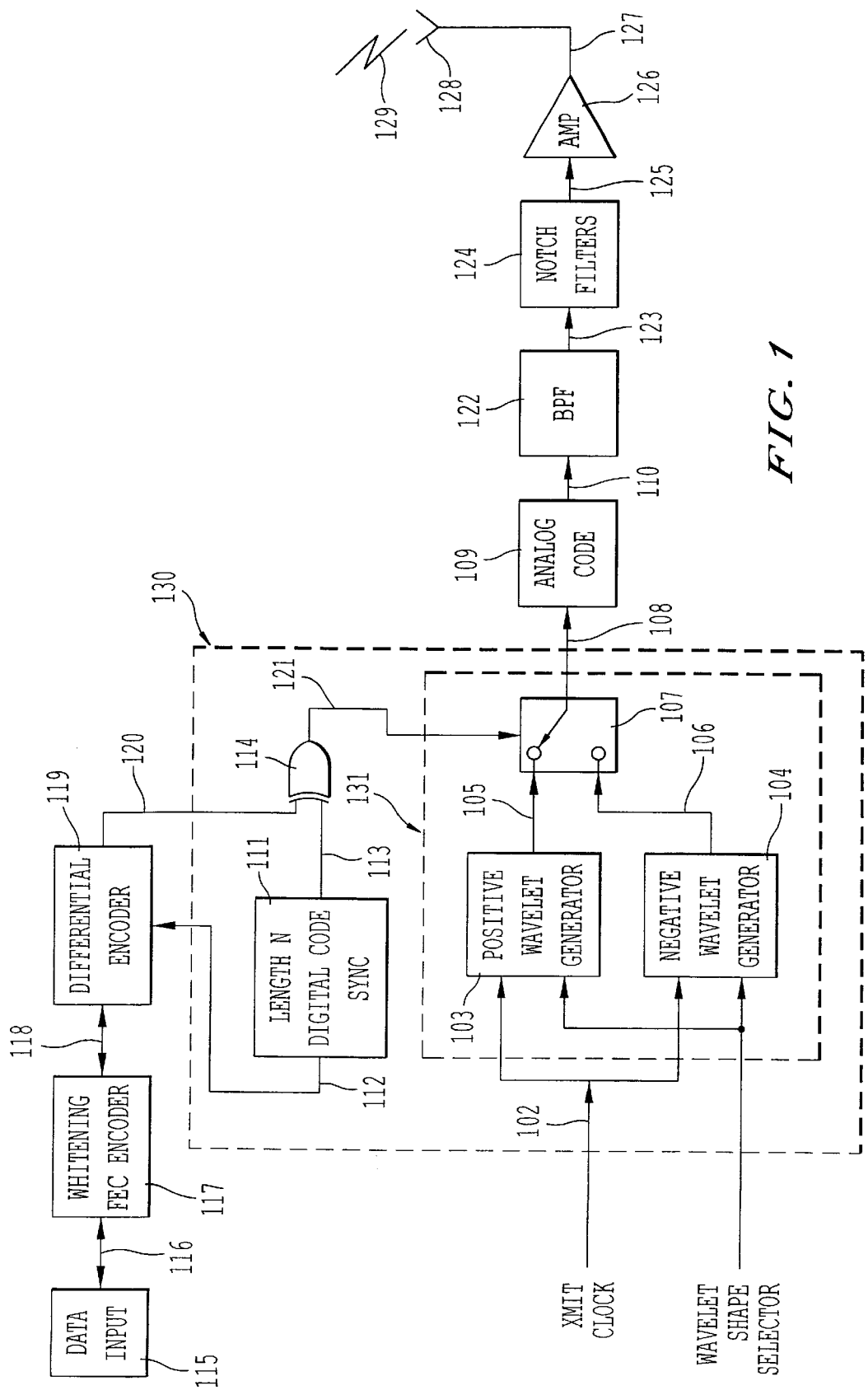
FIG. 1. shows a block diagram of a transmitter section of the new UWB high-speed digital communications system using an embodiment with Concatenated Digital & Analog Code FIGS. 2A–2B. Show a block diagram of the receiver section of the new UWB high-speed digital communications system using an embodiment with a mixer/multiplier "LO" having the full code.

The present communication system is a departure from conventional narrower band transmission systems in that it uses baseband transmission of codes built from time shifted and inverted replicas of short RF pulses rather than a modulated carrier. It is innovative compared to other pulsed waveform systems because it exploits phase as well as time position to create the transmit waveform. This feature allows the system to smoothly vary the peak to average power ratios of both the spectrum and the time domain waveforms and to generate larger collections of codes.

Typical pulse durations are on the order of 100 to 1000 picoseconds with bandwidths of roughly 8 GHz to 1 GHz respectively. The combination of short duration pulses and the coding techniques used spread the signal energy over such a broad frequency band that little energy appears in any narrowband user's band. The result is that the UWB transmitted signal is below the detection threshold of conventional narrowband receivers.

The system makes it practical to transmit information at very high data rates through walls, tunnels, buildings, and other obstructions using signals with high enough spatial resolution to resolve the obstructions that lead to multipath fading in conventional systems.

Multipath occurs when time delayed and attenuated copies of the transmitted waveform arrive at the receiver simultaneously. In urban environments this is due in large part to reflection and transmission of architectural features, e.g. walls, floors, ceilings, and windows.

When the range resolution of the receiver is large compared to the multipath differences, constructive and destructive interference occurs which reduces system performance. This is multipath fading. If, on the other hand, multipath components are resolved by the receiver, then no interference occurs, and the multipath components can be used to improve system performance.

The range resolution of the receiver is roughly inverse to the bandwidth of the transmit signal. So, 10 MHz systems have range resolution of $$R_{res} = \frac{c}{BW} = \frac{3 \times 10^8 \text{ m/sec}}{10 \text{ MHz}} = 30 \text{ m}$$

likewise, a 100 MHz system has 3 meter (10 foot) resolution, and a 1 GHz system has resolution on the order of 0.3 meters (1 foot). Since architectural features (walls, floors, etc.) are separated by distances that are on the order of 10 feet, systems that resolve them well require resolution that is order of 1 foot.

The pulse codes built by the present system are composed of biphase modulated and time shifted replicas of an underlying short wavelet pulse. The receiver compresses the transmitted pulse code using a matched filter (correlation processing). The width of the compressed pulse that results is nominally that of a single pulse. This gives the prototype system spatial resolution that is on the order of one foot— sufficient to avoid the negative effects of multipath, and to allow time domain rake processing.

Theory

The present ultrawideband (UWB) short pulse (SP) communication system uses baseband transmission of codes built from time shifted and inverted replicas of short RF pulses. No carrier is used. Typical pulse durations are on the order of 100 to 1000 picoseconds, and typical bandwidths are greater than 1 GHz. Below, is a short review of time and frequency domain issues related to the UWB communication system. Top level views of the transmitter and receiver are given in FIG. 1 and FIGS. 2A–2B.

Time Domain

A waveform with good bandwidth and derivative properties is the Gaussian monocycle, which is formulated by taking the first derivative of a Gaussian. It has the form of a ramp with a Gaussian envelope $$s(t) = te^{-kt^2}. \quad (1)$$

Figure 5:
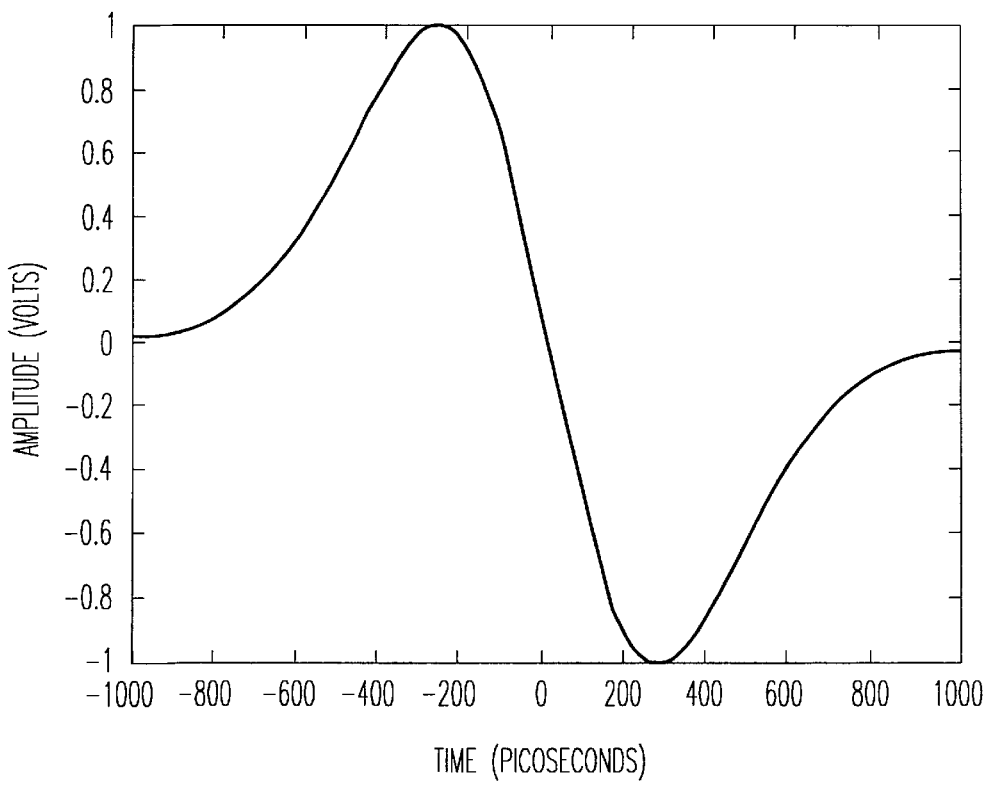
FIG. 5. shows the wave-shape of the first derivative of a Gaussian (a monocycle) approximated by the wavelet generator.

The pulse's duration is a function of the constant k, which controls the rate of decay of the Gaussian envelope. FIG. 5 illustrates the case where the constant k has been selected to generate a pulse duration of roughly 1.5 nanoseconds. Equations (3) to (5) relate the pulse duration to bandwidth.

Circuits for generating these signals include: avalanche transistors; step recovery diodes (SRD) in comb filter circuits; and high speed logic and transistors. The present system currently uses a pulse forming network of high speed discrete logic together with signal conditioning.

Frequency Domain

An important property of UWB signals is the relationship between pulse duration and bandwidth. In general, the narrower a pulse is made in time, the broader the frequency band over which its energy is spread. Thus, if energy per Hertz is fixed, wider bandwidth pulses transmit more energy than narrower ones. From this perspective, shorter in time is always better.

Other criterion effecting the selection of pulse duration include the propagation properties of the band that results. In general, the lower frequencies, HF (3–30 MHz), VHF (30–300 MHz), and UHF (300–1000 MHz) have been shown to have superior materials (building and foliage) penetration relative to higher frequency bands. A good compromise for in-building operation is to span the VHF and UHF bands. This represents a trade-off of energy spreading against the propagation model and engineering feasibility.

To tie pulse duration to bandwidth, consider the Gaussian monocycle of (1). Its frequency domain representation is also Gaussian, and is given by $$S(\omega) = \frac{\omega}{2k}\sqrt{\frac{\pi}{k}} e^{\frac{\omega^2}{4k}} \quad (2)$$

Figure 6:
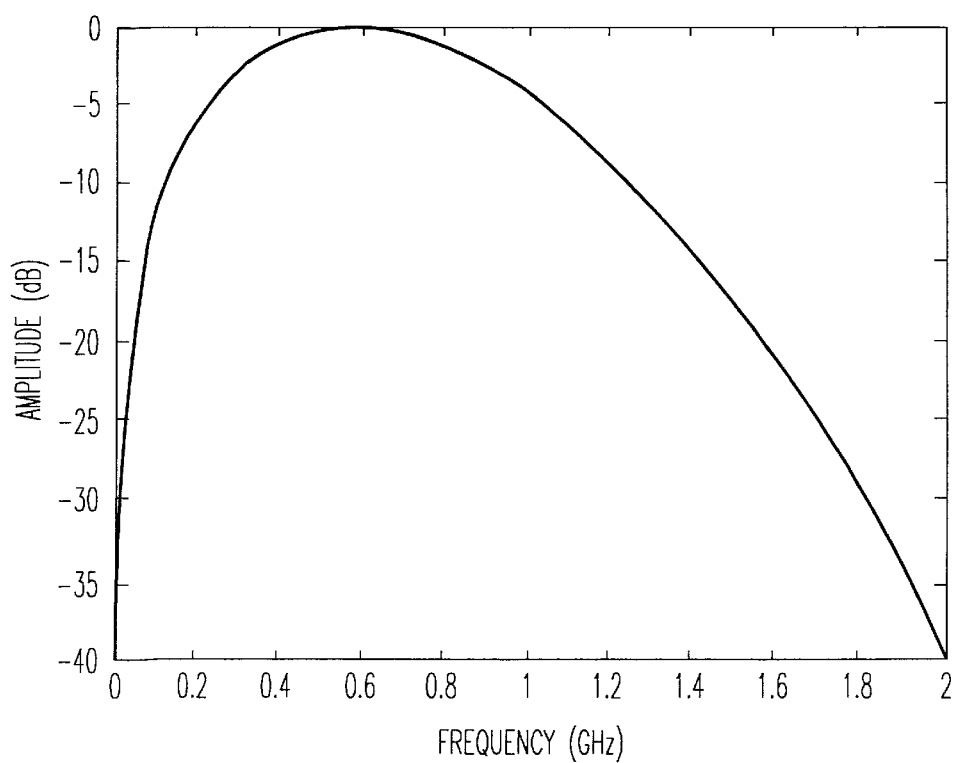
FIG. 6. shows the spectrum of the DOG monocycle wavelet shown in FIG. 5.

The spectrum of a 1 GHz Gaussian monocycle that spans the VHF and UHF bands is shown in FIG. 6. The time duration and bandwidth are both controlled by parameter k. The operating frequency is best described by the peak of the power spectrum which is $$\omega_{max} = \sqrt{2k}, \quad f_{max} = \frac{\omega_{max}}{2\pi}. \quad (3)$$

The bandwidth is determined by the upper and lower frequencies to the 6 dB down power levels $$f_{lo} = 0.3191057 f_{max}$$
$$f_{hi} = 1.9216229 f_{max} \quad (4)$$

and the center frequency is $$f_c = \frac{f_{lo} + f_{hi}}{2} = 1.12 f_{max}. \quad (5)$$

If $\sqrt{k} = 2.5 \times 10^9$, then $f_{max} = 560$ MHz, the bandwidth is 1 GHz, and the pulse duration is 1.5 nanoseconds. Typical of UWB signals, the power is spread over a band greater than 100% of the operating frequency.

Codes for Integration and Channelization

The transceivers of the present invention use pulse codes for integration gain, channelization, whitening, and notch filtering. The pulse coded transmit signal is formed from shifted (time hopped) and inverted (biphase) copies of the underlying ultrawideband short pulse.

The time shifts and phase inversions are implemented with a combination of analog and digital circuitry: fixed and programmable delays; phase inverters (hybrid tees); splitters and combiners; GaAs switches; and digital circuits to generate control.

A template for a biphase-time hopped code h(t) can be written as a sum of weighted and shifted impulses as $$h(t) = \sum_{n=0}^{N_c-1} h_n \delta(t - T_n), \quad (6)$$

where, $T_n$ is the relative position of chip n, $N_c$ is the length of the code, and the coefficients of the code are $h_n \in \{-1, 1\}$ for biphase (antipodal) operation. The frequency domain representation of the code h(t) is $$H(\omega) = \sum_{n=0}^{N_c-1} \int_{-\infty}^{\infty} h_n \delta(t - T_n) e^{-j\omega t} dt \quad (7)$$

$$= \sum_{n=0}^{N_c-1} h_n e^{-j\omega T_n}.$$

The pulse code is formed from the short pulse in equation (1) and the code template in equation (6) as $$p(t) = s(t) * h(t) \quad (8)$$

$$= s(t) * \sum_{n=0}^{N_c-1} h_c \delta(t - T_n)$$

$$= \int_{-\infty}^{\infty} s(\tau) \sum_{n=0}^{N_c-1} h_n \delta(t - T_n - \tau) d\tau$$

$$= \sum_{n=0}^{N_c-1} h_n \int_{-\infty}^{\infty} s(\tau) \delta(t - T_n - \tau) d\tau$$

$$= \sum_{n=0}^{N_c-1} h_n s(t - T_n)$$

a collection of shifted and inverted (weighted ±1) replicas of the underlying pulse. The frequency domain representation of the pulse code shown in equation (8) is $$P(\omega) = H(\omega) S(\omega) \quad (9)$$

If the data are treated as a set of equispaced impulses, they have the time and frequency domain representations $$d(t) = \sum_{k=0}^{N_d-1} d_k \delta(t - kT_c), \quad (10)$$

$$D(\omega) = \sum_{k=0}^{N_d-1} d_k e^{-j\omega kT_c},$$

$$d_k \in \{-1, 1\}.$$

Temporarily restricting the system to only biphase modulation of the pulse code in equation (8), the transmit signal is $$x(t) = d(t) * h(t) * s(t) \quad (11)$$

$$= \sum_{k=0}^{N_d-1} d_k p(t - kT_c)$$

$$= \sum_{k=0}^{N_d-1} \sum_{n=0}^{N_c-1} d_k h_n s(t - T_n - kT_c).$$

Which has the spectrum $$X(\omega) = D(\omega) P(\omega) = D(\omega) H(\omega) S(\omega). \quad (12)$$

If the data are assumed white, or whitened by preprocessing, then the spectrum of the transmit waveform is that of the coded pulse of equation (8). Proper selection of the delays and weights of the pulse code preserve the pulse's spectrum and bandwidth, leading to a transmit waveform that is essentially that of the short pulse in equation (1). That is, nominally white across the operational bandwidth.

Receiver

Figure 19:
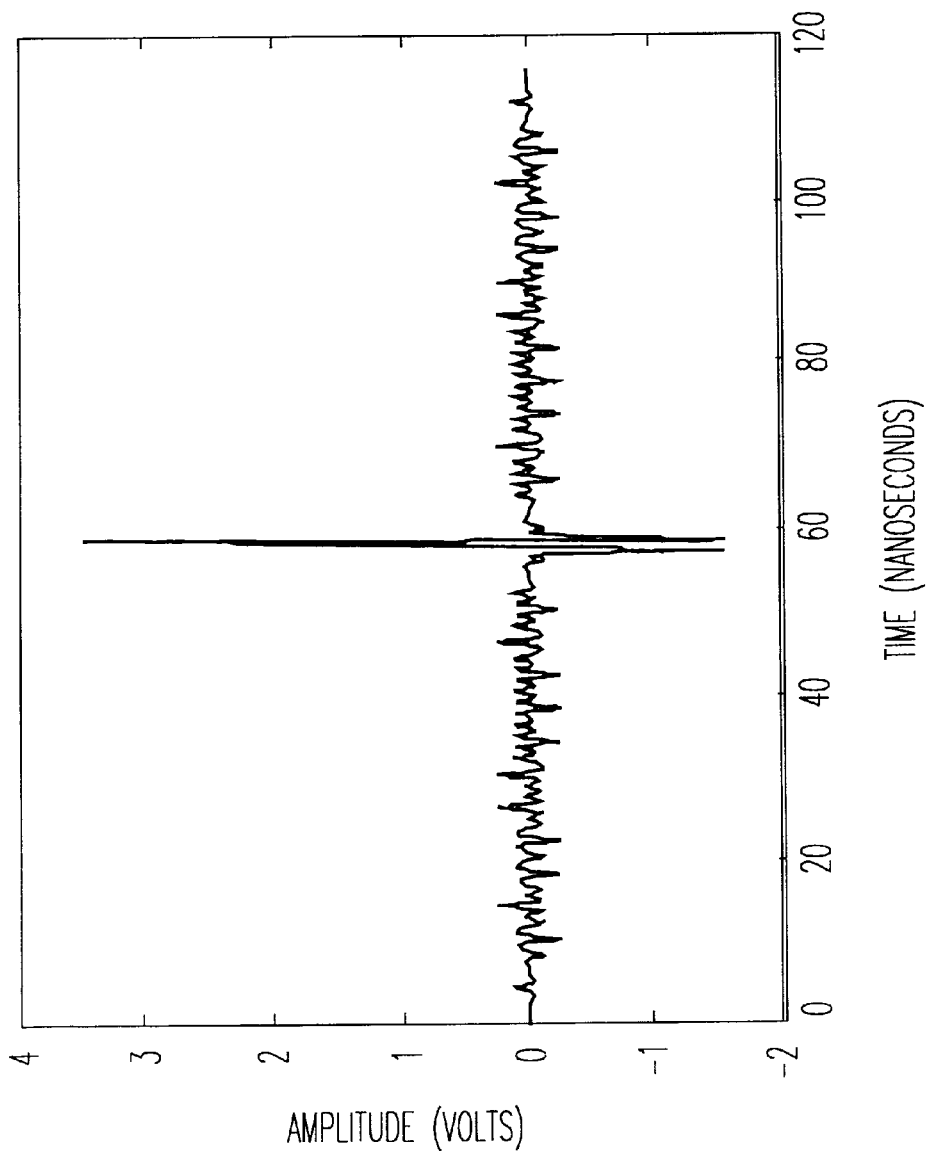
FIG. 19. shows the autocorrelation of a transmit code, illustrating the high spatial resolution which allows operation in severe multipath.

UWB transceivers face many of the same problems that narrower band systems do: transceiver clocks are not synchronized; transceiver codes are not synchronized; and clocks are either not exactly at the same frequency, or drift apart as a function of time, temperature, and relative position. The problem of synchronizing the transceiver clocks amounts to finding the unknown time delay that corresponds to the maximum of the correlation. FIG. 19 illustrates that the correlation peak is exceedingly narrow. This narrowness gives the UWB communications system the ability to operate in the midst of multipath, because the multipath can be resolved.

Sliding Correlator DLL (Delay Locked Loop)

While we generally do not form the entire correlation function on a single sequence, we can form single terms of it and then slide the position (or lag) of that single term from sequence to sequence. This technique is known as a sliding correlator. We use the sliding correlator for clock acquisition, clock tracking, and data detection. We also use the sliding correlator to scan for the location of the highest signal. This location changes dynamically due to objects moving in the environment, or to motion between the transmitter and receiver, as in mobile applications. A sliding correlator forms inner products—signal multiplication (mixing) followed by integration—of the received signal and the local code at different relative time delays.

A simple method of clock acquisition (determining the unknown delay) is to increment the time delay through a code length, while looking for the inner product with the largest absolute value. In spread systems this is often called turning the code wheel. Once the delay is selected, the sign and magnitude of the inner product are used for the bit detection statistic.

Clock tracking is implemented with a delay locked loop (DLL). Because the correlation is symmetric, the receiver can use the difference between a leading and lagging inner product to track the transmit clock. When the receiver is synchronized, the difference goes to zero. Otherwise, the difference is positive or negative depending on whether the timing is leading or lagging.

Radio Frequency Interference

Figure 20:
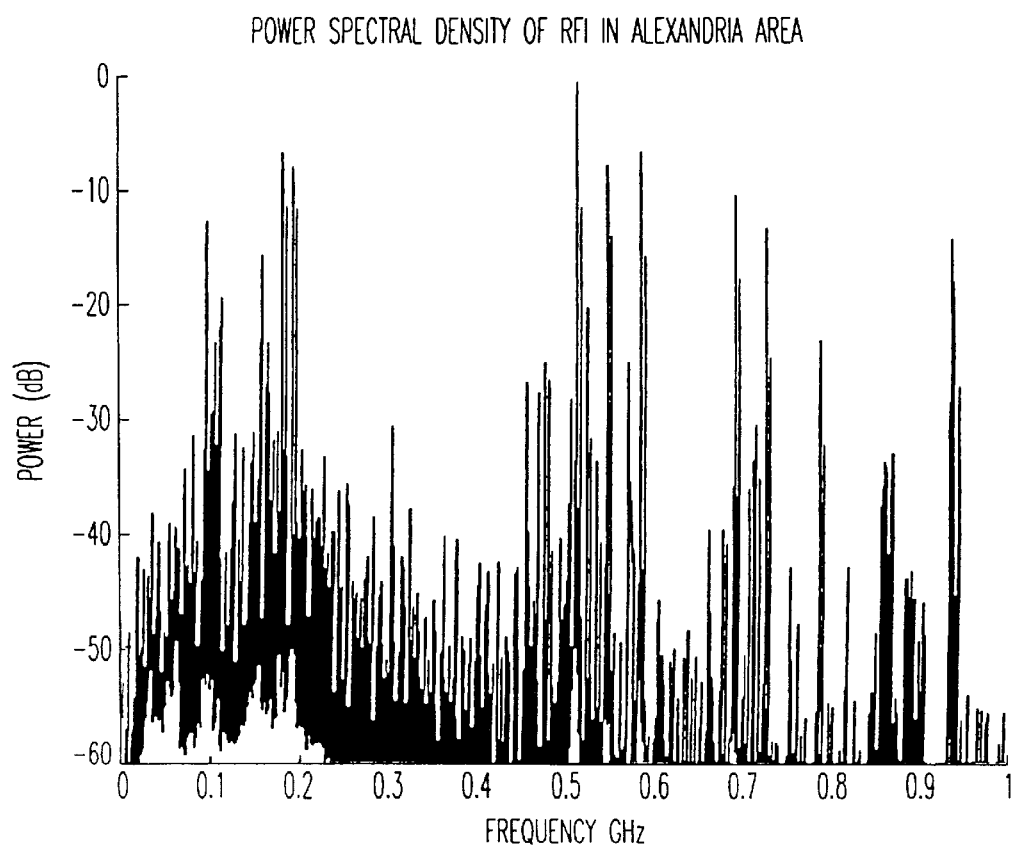
FIG. 20. shows the received power spectral density of RFI in Alexandria Va.
Figure 22:
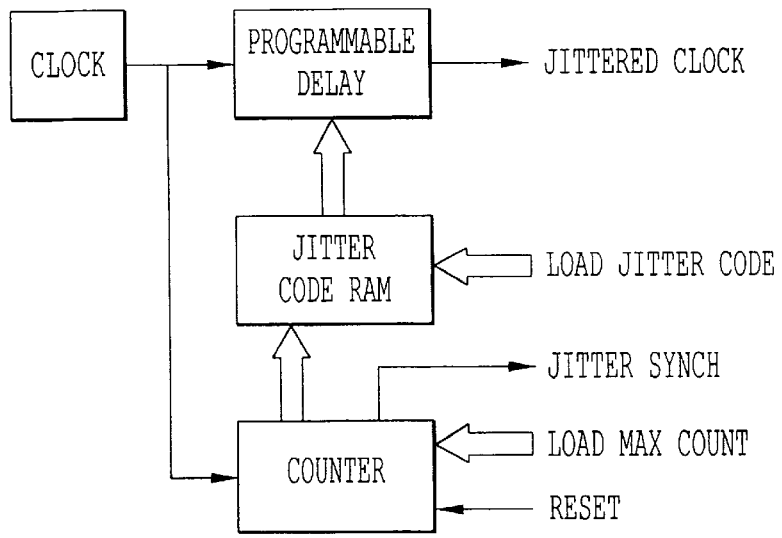
FIG. 22 shows an embodiment for jittering the clock using a jitter code stored in RAM.
Figure 23:
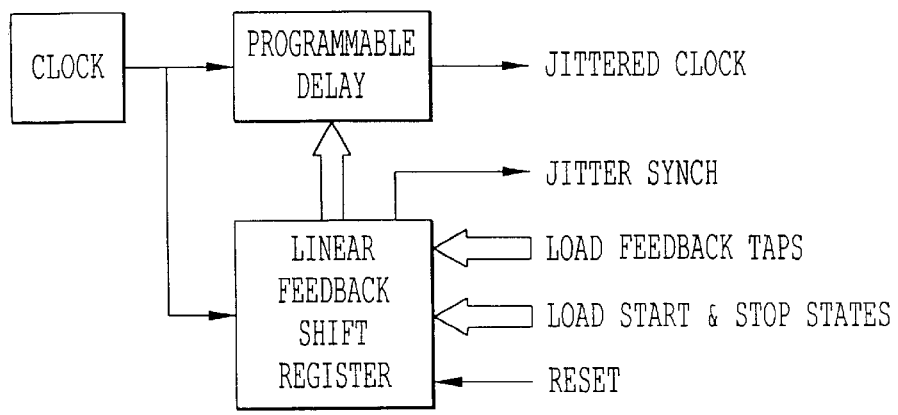
FIG. 23 shows an embodiment for jittering the clock using a linear feedback shift register.
Figure 24:
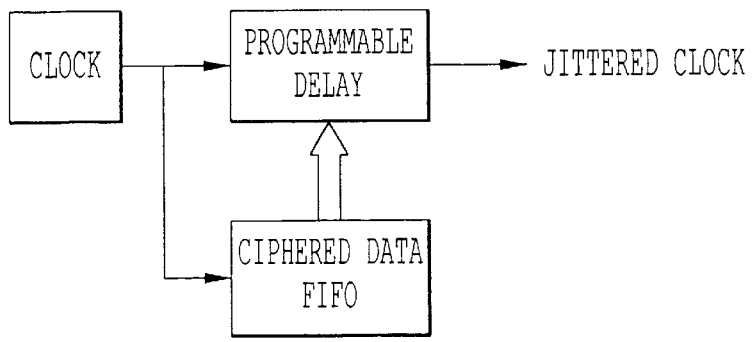
FIG. 24 shows an alternate embodiment for jittering using a ciphered data sequence.

From the perspective of UWB systems, narrowband interference dominates the noise in urban environments. Because the UWB SP signal is "short in time" and "long in frequency" it is highly distinguishable from conventional narrowband signals which are "long in time" and "short in frequency". FIG. 20 illustrates the power spectral density at an Alexandria, Virginia laboratory. The differences between these signal types are exploited to develop RFI extraction (radio frequency interference) algorithms to improve UWB transmissions. The authors have already developed and demonstrated RFI extraction algorithms that achieve up to 20 dB SNR improvement. FIGS. 21A–21B illustrate the results of the developed RFI extraction algorithm on collected data.

DETAILED DESCRIPTION

In the detailed descriptions we describe the operation of the UWB short pulse transmitter and receiver. Both cases begin with expressions for the key waveforms generated, and then relate their elements to the circuits.

Transmitter

A block diagram of the transmitter is shown in FIG. 1. Its goal is to generate the waveform of equation (11), which was $$x(t) = d(t) * h(t) * s(t) \qquad (13)$$

$$= \left(\sum_{k=0}^{N_d-1} d_k \delta(t - kT_c)\right) * \left(\sum_{n=0}^{N_c-1} h_n \delta(t - T_n)\right) * s(t)$$

$$= \sum_{k=0}^{N_d-1} \sum_{n=0}^{N_c-1} d_k h_n s(t - T_n - kT_c).$$

In this formulation, the transmit waveform is defined as the convolution of the data stream d(t) with the code h(t), and the underlying pulse s(t).

Data Stream

Figure 16:
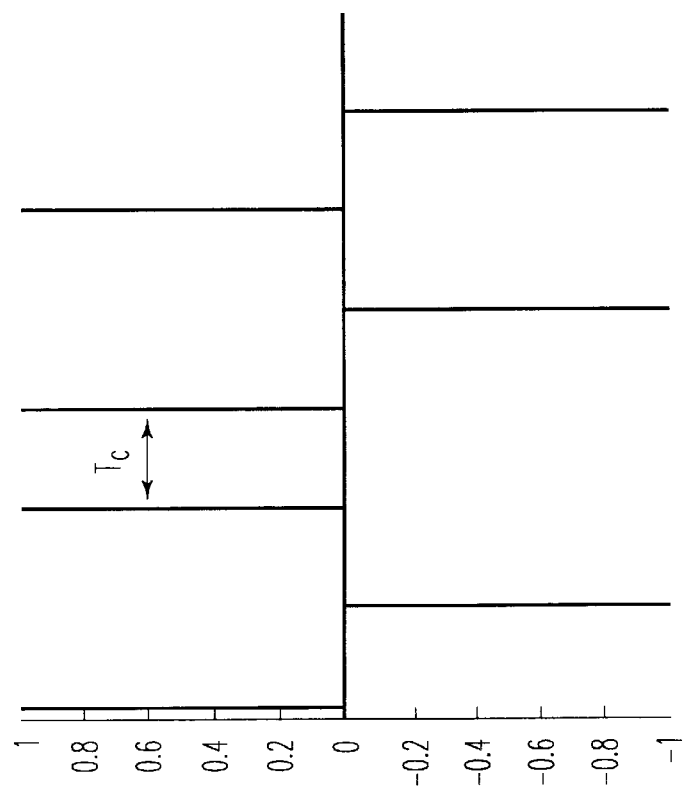
FIG. 16. shows a plot of example data stream, $d_k$=[1, 0, 1, 1, 0, 1, 0], which would be convolved with the wavelet function and the code stream.

The transmitter receives data from data input 115. Mathematically, the binary data d(t) are represented by a stream of equispaced impulses, one per data bit, indexed by k. FIG. 16 is an example for the data $d_k$=[1, 0, 1, 1, 0, 1, 0], as a stream of positive and negative going impulses, one per data bit, where the mapping $\{0,1\} \to \{-1,1\}$ has been applied.

Data Whitening and Differential Encoding

There are two special conditions on the data. The first is that the data must be pre-whitened, or scrambled. This means that it has been processed such that its spectrum is nominally flat. The reason for requiring this is that, by the convolution theorem, the spectrum of the transmit signal (13) is the product of the spectrums of the pulse $S(\omega)$, the code $H(\omega)$, and the data $D(\omega)$. That is, $$X(\omega)=D(\omega)H(\omega)S(\omega). \qquad (14)$$

Since the code and the pulse are both generated by the transmitter such that $H(\omega)$ and $S(\omega)$ are nominally flat over the bandwidth of the system, the spectrum of the output will go as the spectrum of the data. That is, if the spectrum of the data is white over some interval, then the output will be white over that interval. Consider that if the data were constant, say all ones, then d(t) would be a train of unit impulses $T_c$ periodic, resulting in line spectra at frequency bins spaced by $f_c=1/T_c$, all the transmit energy would be concentrated at multiples of $f_c$, and the outcome would be interference with any narrowband user at those frequencies. Referring to FIG. 1, block 117 applies this data scrambling to the data. It also can apply forward error correction coding (FEC), such as combinations of interleaving, Reed-Solomon block codes, and convolutional codes. Many books are available on the topic of FEC.

The second condition is that the data must be differentially encoded. The reason for this constraint is that the transmit waveform is arbitrarily inverted by the environment. The result is that the receiver cannot tell if a non-inverted wavelet or an inverted wavelet was transmitted, but it can tell if two are alike or opposite. Differential encoding allows the receiver to recover the data in that manner. It is applied in block 119. By employing differential encoding of the data prior to transmission, we can use phase information as well as pulse position to create pulse codes.

Digital Codes & Modulation

Figure 12:
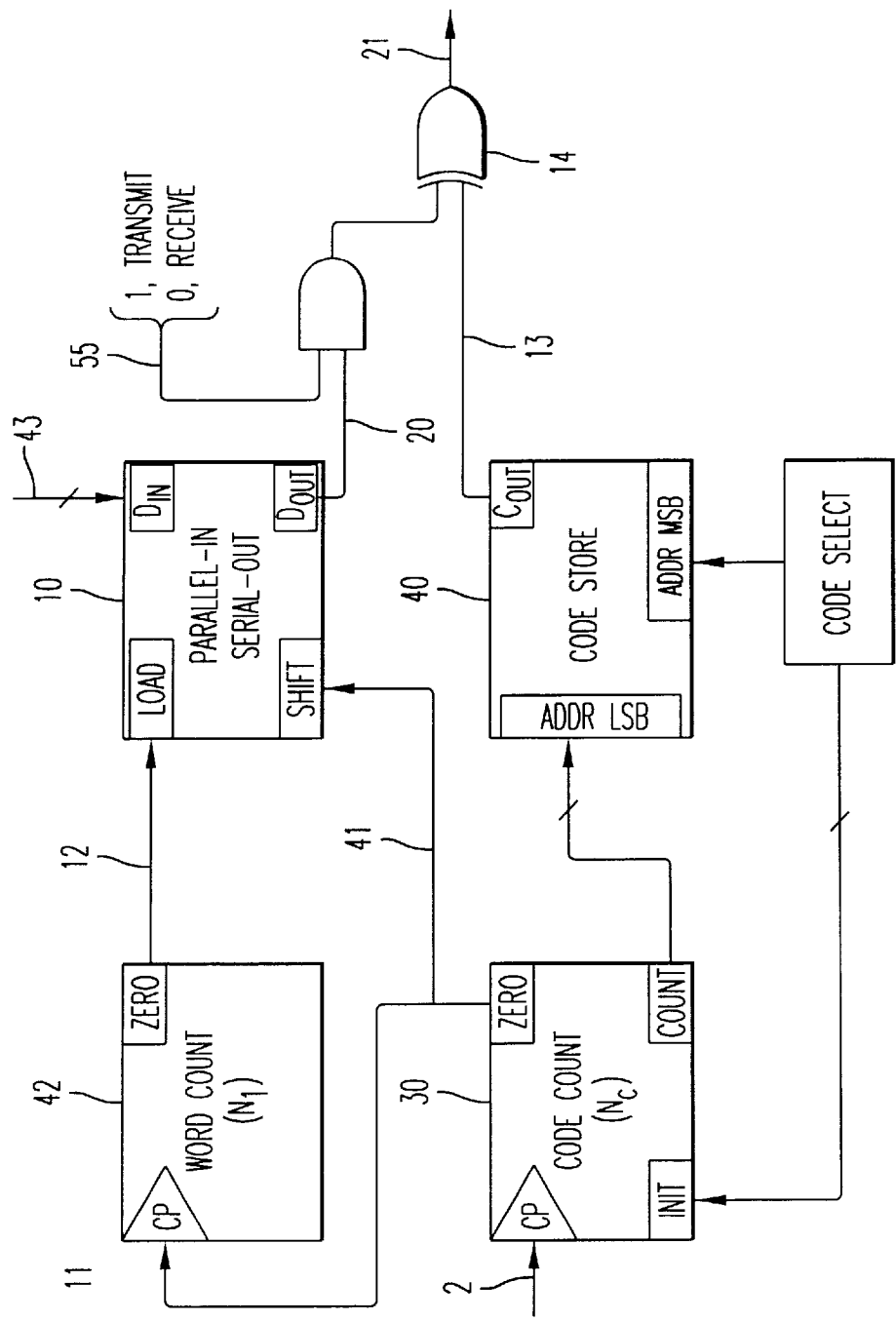
FIG. 12. shows a block diagram for generating the data-modulated digital code for transmit and receive modes.

In this system the data are transmitted by biphase modulation of codes rather than modulation of a carrier. Block 111 generates a cyclical stream of pseudo-random bits representing the digital code. Each time the cycle repeats, synch signal 112 triggers differential encoder 119 so that alignment of the data modulation on 120 can occur. Exclusive or gate 114 modulates the digital code on 113 to produce the modulated code sequence on 121. FIG. 12 gives an alternative block diagram of a circuit capable of performing the modulation. These circuits produce the data modulated code, independent of the pulse waveform. That is $$y(t) = d(t) * h(t) \qquad (15)$$

$$= \left(\sum_{k=0}^{N_d-1} d_k \delta(t - kT_c)\right) * \left(\sum_{n=0}^{N_c-1} h_n \delta(t - T_n)\right)$$

$$= \sum_{k=0}^{N_d-1} \sum_{n=0}^{N_c-1} d_k h_n \delta(t - T_n - kT_c)$$

$$= \sum_{k=0}^{N_d-1} d_k \sum_{n=0}^{N_c-1} h_n \delta(t - T_n - kT_c),$$

$d_k, h_n \in \{-1,1\}$ which says that for each bit, $d_k$, of the data stream, a pulse code h(t) is generated, and the entire code is then multiplied by $d_k$. The effect is to either invert, or not invert, the code h(t) depending on whether $d_k$ was a -1 or 1 respectively. Much of the code generation and modulation is processed digitally. In these circuits modulo 2 addition (exclusive nor) replaces traditional multiplication, and $\{1,-1\}$ are mapped to $\{1,0\}$. FIG. 16 illustrates a data stream.

Figure 17:
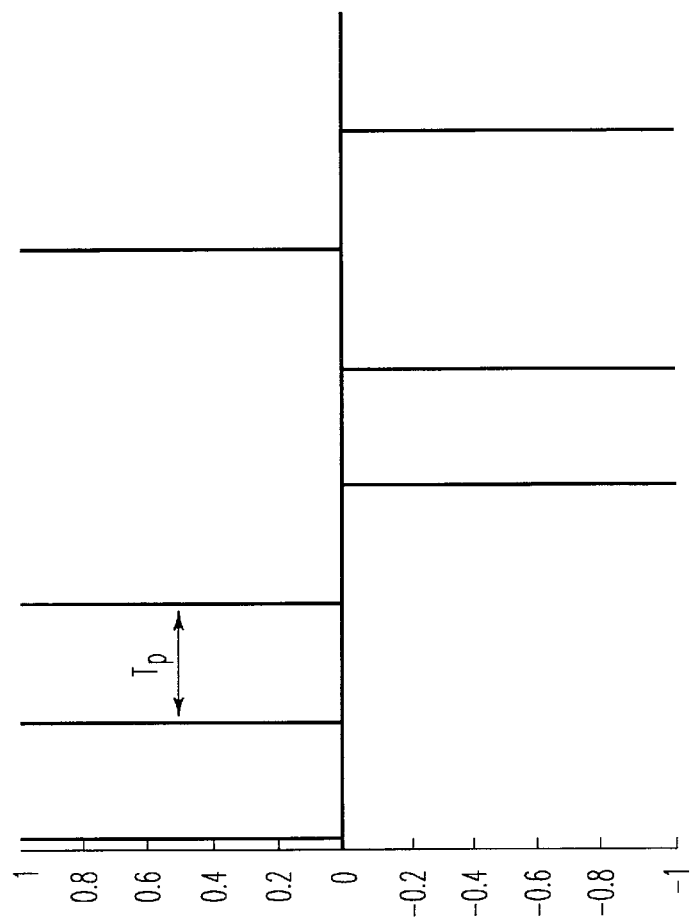
FIG. 17. shows a plot of an example, equispaced code stream, $h_n$=[1, 1, 1, 0, 0, 1, 0], which would be convolved with the wavelet function.
Figure 18:
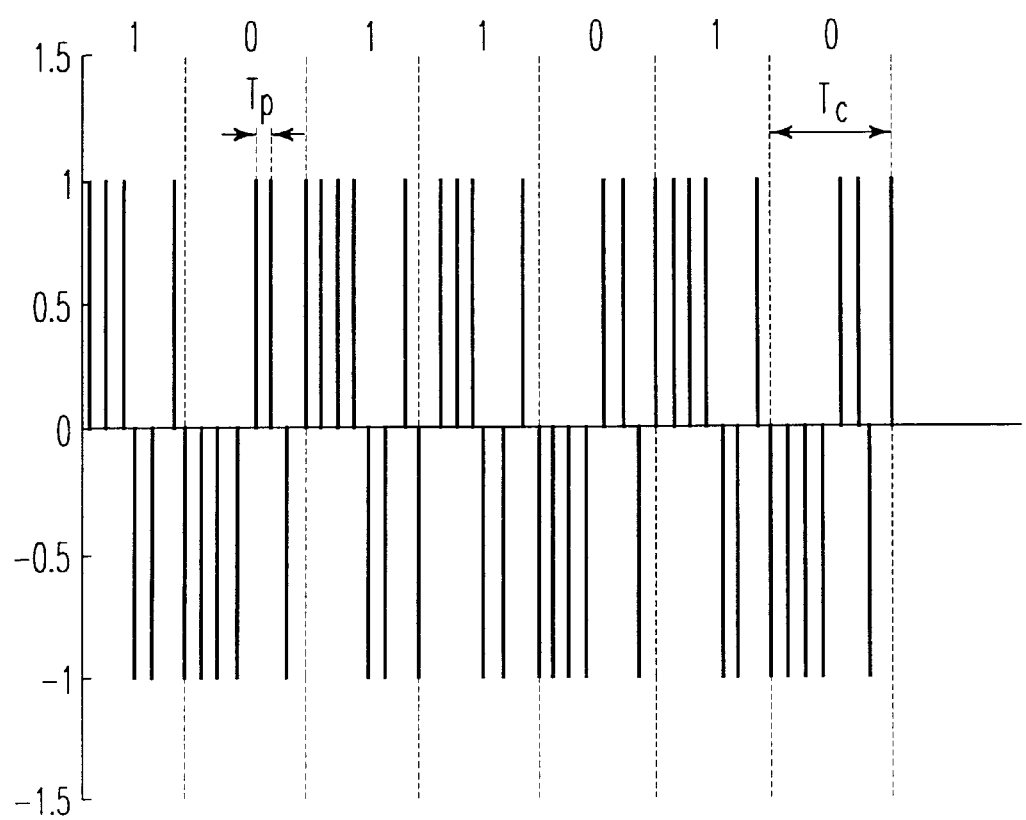
FIG. 18. shows a plot of the convolved data and code streams y(t)=h(t)*d(t) from FIG. 16 and FIG. 17.

The coefficients $h_n$ of the digital code are binary sequences of 1's and 0's occurring at times $T_n$ relative to the start of the code. A sample 7 length code is shown in FIG. 17. In this case the coefficients are equispaced, say $T_p$ seconds apart, thus $T_n=nT_p$. FIG. 18 illustrates the data modulated code that results from applying equation (15) to the data and code of FIGS. 16 and 17.

Referring to the block diagram in FIG. 12, and equation (15), the coefficients of the code are stored in memory 40 and addressed by counter 30. The counter generates the code index n, and counts from 0 to $N_c-1$, the length of the code. The counter is incremented once for each coefficient of the code, at intervals of $T_n$ seconds. Following each increment of counter 30 the corresponding coefficient is emitted from the memory to line 13.

In equation (15), one code word is applied to each data bit. These are synchronized by parallel to serial register 10 and word counter 42. When counter 30 completes the count for a single code word it asserts line 41 which signals register 10 to output one bit. When line 41 is asserted it also signals word counter 42 to advanced the count of data bits shifted out. This counter is programmed to count to $N_i$, the width in bits of a data word (whitened and differentially encoded). When the counter has been advanced $N_i$ times, it asserts line 12 which signals register 10 to load another data word. It is also possible to compute the code coefficients on the fly, for example, with a linear feedback shift registers.

Referring to FIG. 1, the coefficients of the code and the bits of the data are presented to exclusive or (XOR) gate 114, which produces y(t), the code modulated data, that is presented to the pulse forming network on line 121. Switch 107, responds to the modulated code 121 to selectively output a positive (non-inverted) or negative (inverted) wavelet onto 108. Positive wavelet generator 103, and negative wavelet generator 104 produce a wavelet in response to an xmit clock signal 102. The shape of the wavelet is selected by 132.

Pulse Forming & Pulse Modulation

Figure 3:
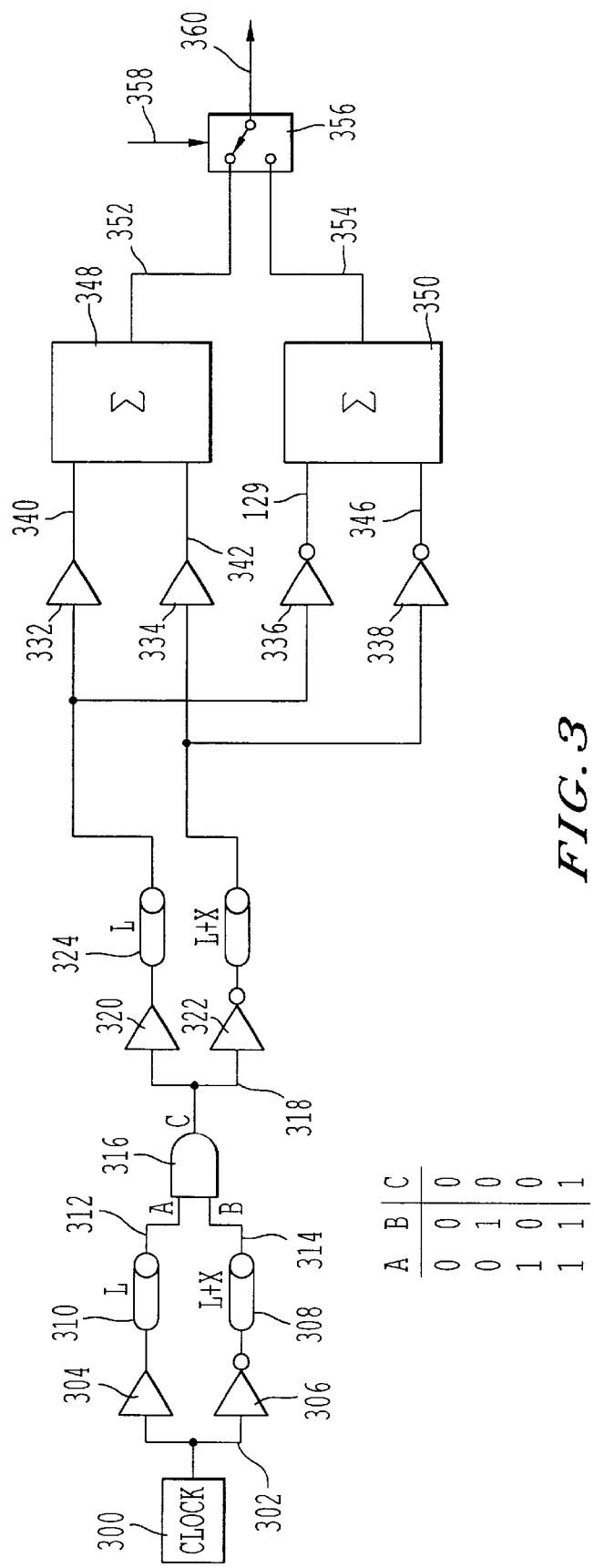
FIG. 3. shows a simplified block diagram for a wavelet generator that generates a pseudo derivative-of-Gaussian (DOG) wavelet shape typically used in the transmitter.
Figure 4:
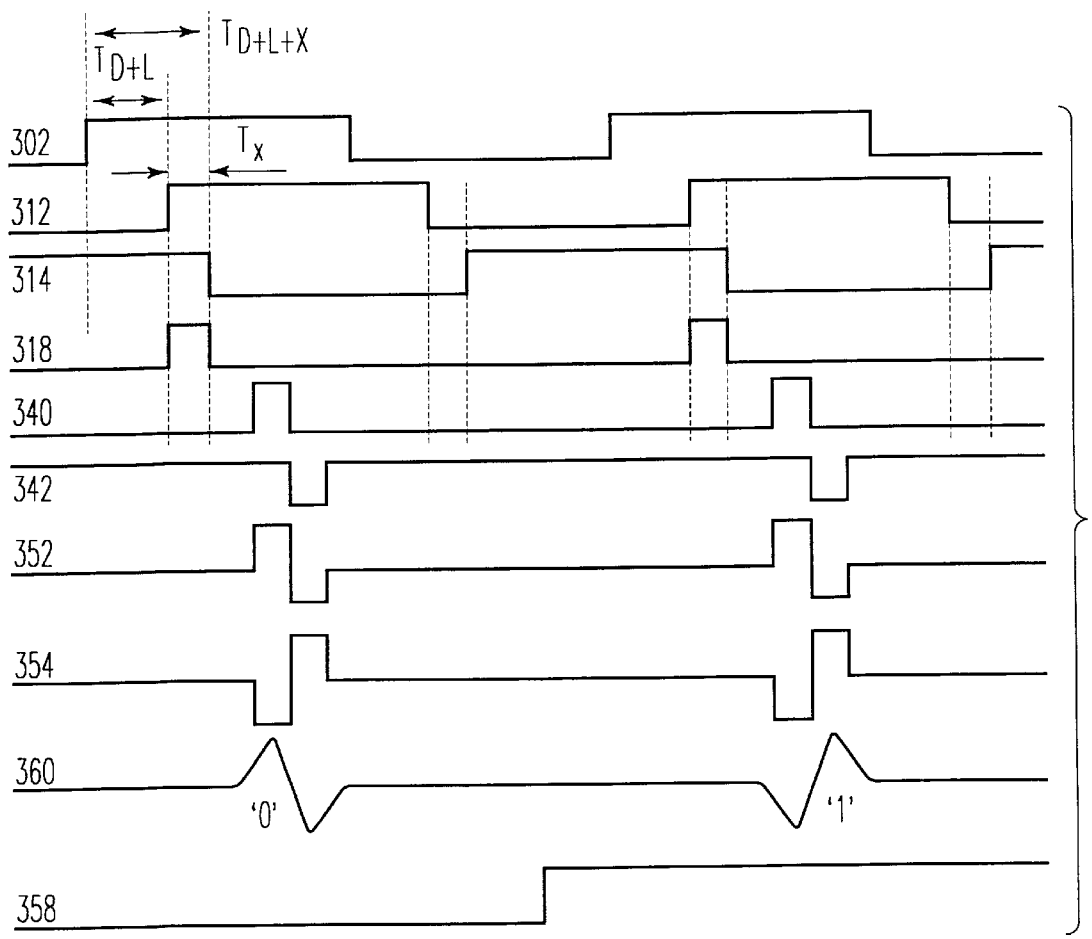
FIG. 4. shows a timing diagram for the wavelet generator shown in FIG. 3.
Figure 7:
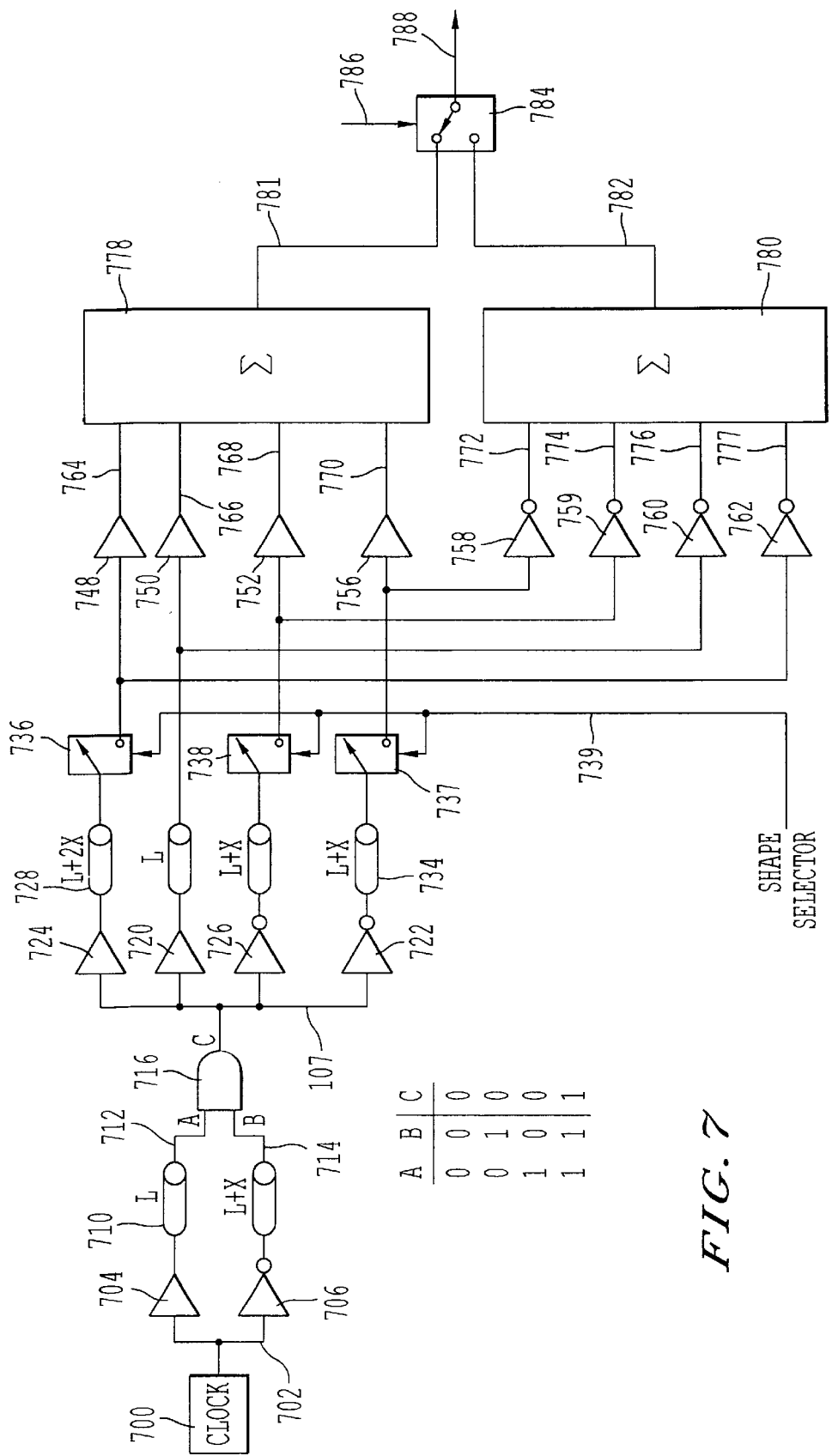
FIG. 7. shows a diagram for a wavelet generator with selectable shapes of the $n^{th}$ derivative of a Gaussian where n=0, 1, or 2.
Figure 8:
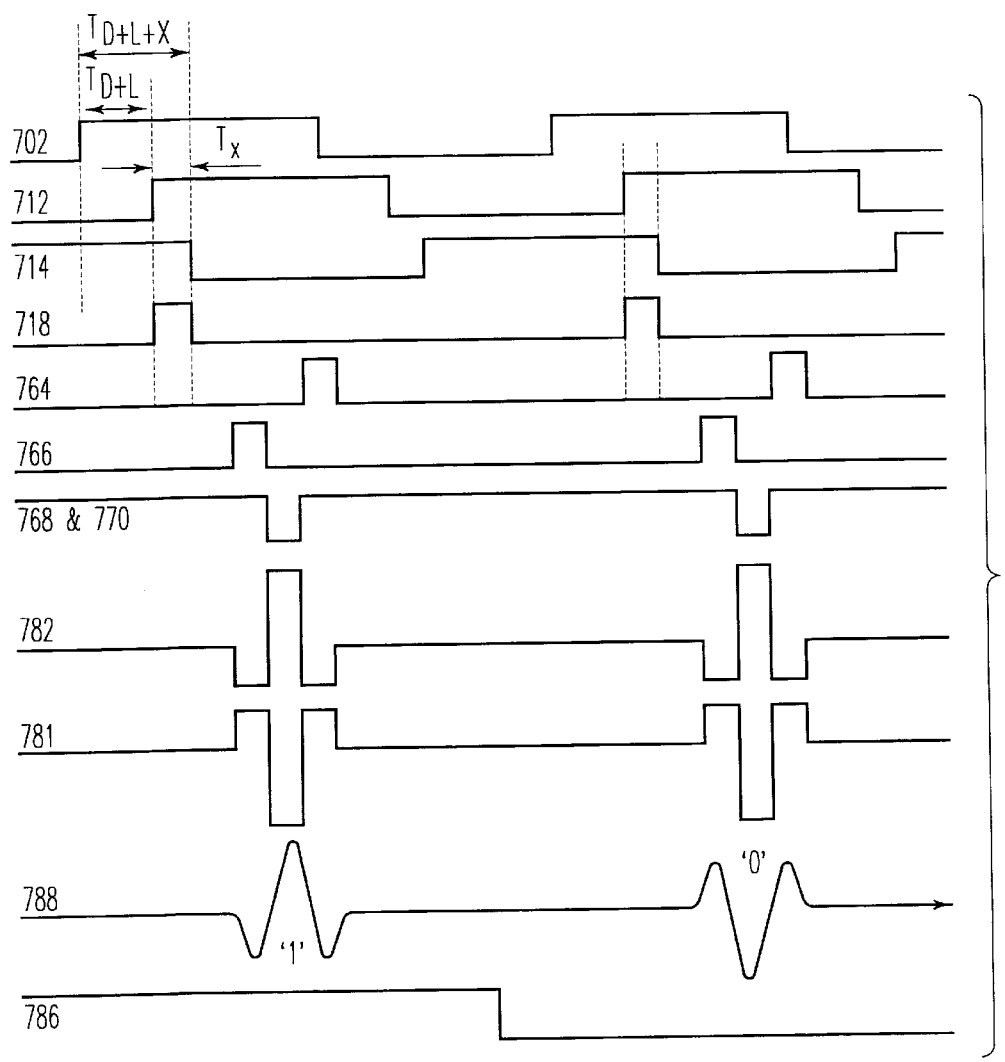
FIG. 8. shows a timing diagram for the wavelet generator shown in FIG. 7 with $2^{nd}$ derivative of a Gaussian waveshape selected as is typically used for the receiver.

Circuits for generating short pulses include: avalanche transistors; step recovery diodes (SRD) in comb filter circuits; and high speed discrete logic and transistors. The present system generates short pulses using circuits built from discrete logic gates and passive delay lines. FIG. 3 shows a simplified diagram of a differential ECL implementation that generates a wavelet approximating the first derivative of a Gaussian. FIG. 4 shows a timing diagram for FIG. 3. FIG. 7 is a block level diagram of a wavelet generator with selectable wave-shape. FIG. 8 shows a timing diagram for FIG. 7 with the switches selected to produce the second derivative of a Gaussian. Switch 784 applies the data modulated code on 786 to select the polarity of the transmitted wavelet. Switches 736, 738, and 737 are driven to select the zero, first, or second derivative of a Gaussian. In the block diagram of FIG. 7 signal is delayed by different line lengths into ports A(712) and B(714) of AND gate716. The timing diagrams shown in FIGS. 4 and 8 show idealized waveforms for clarity. The actual rise and fall times of the devices, however, produce the "filtered" output waveforms shown. Typically, the transmitter and receiver wavelet functions are not identical. Instead, the shape of the wavelet used in the receiver is typically the derivative or Hilbert transform of the shape used in the transmitter.

Analog Codes

Unique to the present invention is the ability to concatenate codes and allow implementations of the two codes in different technology. Referring to FIG. 1, analog code 109 is implemented extremely wide bandwidth microwave components which do not have the limitations of semiconductor technologies. Therefore, the present invention can generate codes composed of both digital and analog parts. The digital, $h_d(t)$, and analog, $h_a(t)$, codes are given by $$h_d(t) = \sum_{m=0}^{M-1} g_m \delta(t - T_m), \quad (16)$$

$$h_a(t) = \sum_{q=0}^{Q-1} a_q \delta(t - T_q),$$

$$g_m, a_q \in \{-1, 1\}.$$

The effect on the formulation of equation (15) is to replace h(t) with the concatenated code $$h(t) = h_a(t) * h_d(t) \quad (17)$$

$$= \left(\sum_{m=0}^{M-1} g_m \delta(t - T_m)\right) * \left(\sum_{q=0}^{Q-1} a_q \delta(t - T_q)\right)$$

$$= \sum_{m=0}^{M-1} \sum_{q=0}^{Q-1} a_q g_m \delta(t - T_q - T_m).$$

The system can be operated with either digital only or analog only codes. The purpose of the analog code is to generate waveforms whose pulses occur faster than can be processed digitally. A replica of the analog code replaces each pulse of the digitally generated code on a fine time scale. Good codes for the analog section have low autocorrelation sidelobes, like Barker codes. The reason for this is that the sidelobe structure of the concatenated code will contain all combinations of the main and side lobes of the component codes.

Figure 10:
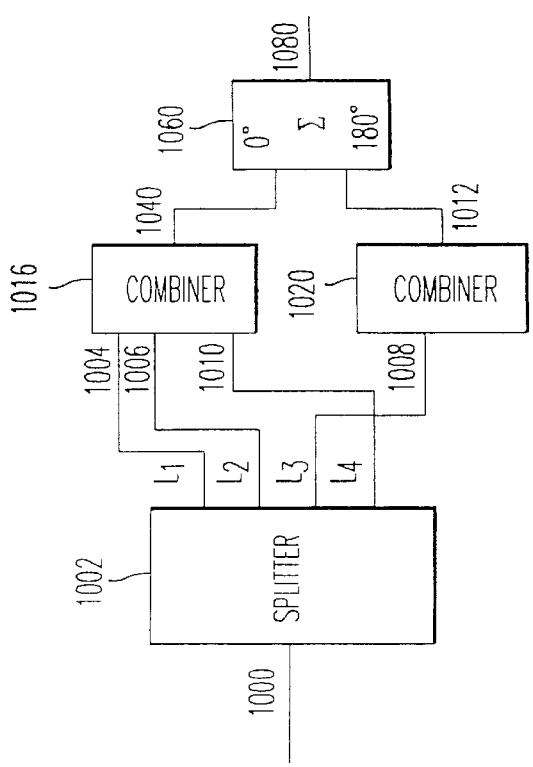
FIG. 10. shows a block diagram for a simple example analog code $h_a$=[1, 1, −1, 1].
Figure 11:
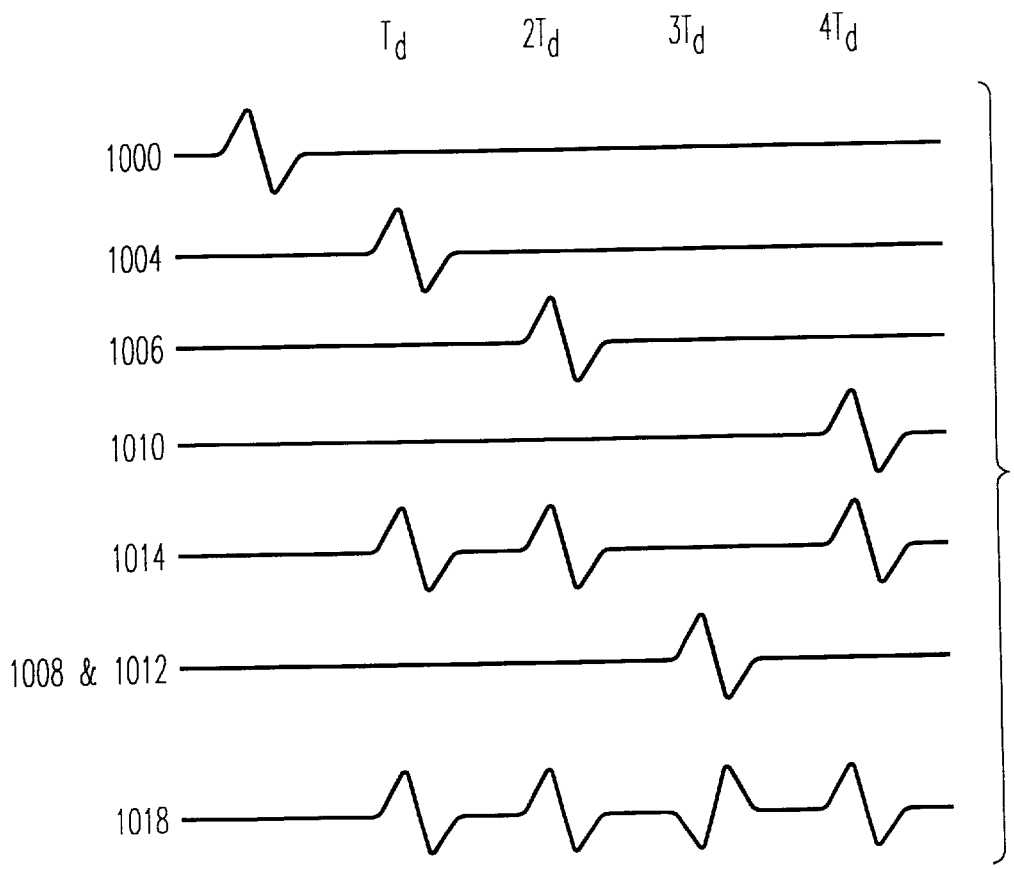
FIG. 11. shows a timing diagram and the waveforms involved with constructing the analog code shown in for FIG. 10.

FIG. 10 shows a very simplified block level diagram of a circuit for generating an analog code. FIG. 11 shows the timing diagram associated with it. The digitally modulated code of wavelet pulses from signal 1000 are input to splitter 1002. The present implementation employs passive power splitters, alternatives depending on cost, size, and power, include resistive dividers and active networks. The line lengths $L_1$ to $L_4$ on 1004 thru 1010 at the outputs of the power splitter are selected to delay the pulses in time. In order to generate the delays $T_n$ in (b) of the figure, the required line lengths are $$L_n = n \epsilon_r T_d, n=1, \ldots, 4$$

where $\epsilon_r$ is the propagation velocity in the media and delays of multiples of $T_d$ were required. In general, the delays are not restricted to be common multiples. All the pulses in time slots that are not inverted are summed together in power combiner 1016, and all pulses in time slots that are to be inverted are summed together in power combiner 1020. The pulses to be inverted are subtracted from the non-inverted set by hybrid 1060, and the difference is output on signal 1080.

Referring to FIG. 1, prior to final amplification and transmission the signal may be bandpass filtered by 122 in, to suppress energy in frequency bands out of the operational band of the receiver. The output signal can also be notched filtered by 124 to remove energy from other narrowband signals as appropriate. Another strategy to create notches in the output spectrum is to design the codes h(t) such that the undesirable frequencies are attenuated in the pulse code p(t)=s(t)*h(t). Amplifier 126 drives antenna 128 to broadcast the sequence of wavelets.

Figure 9:
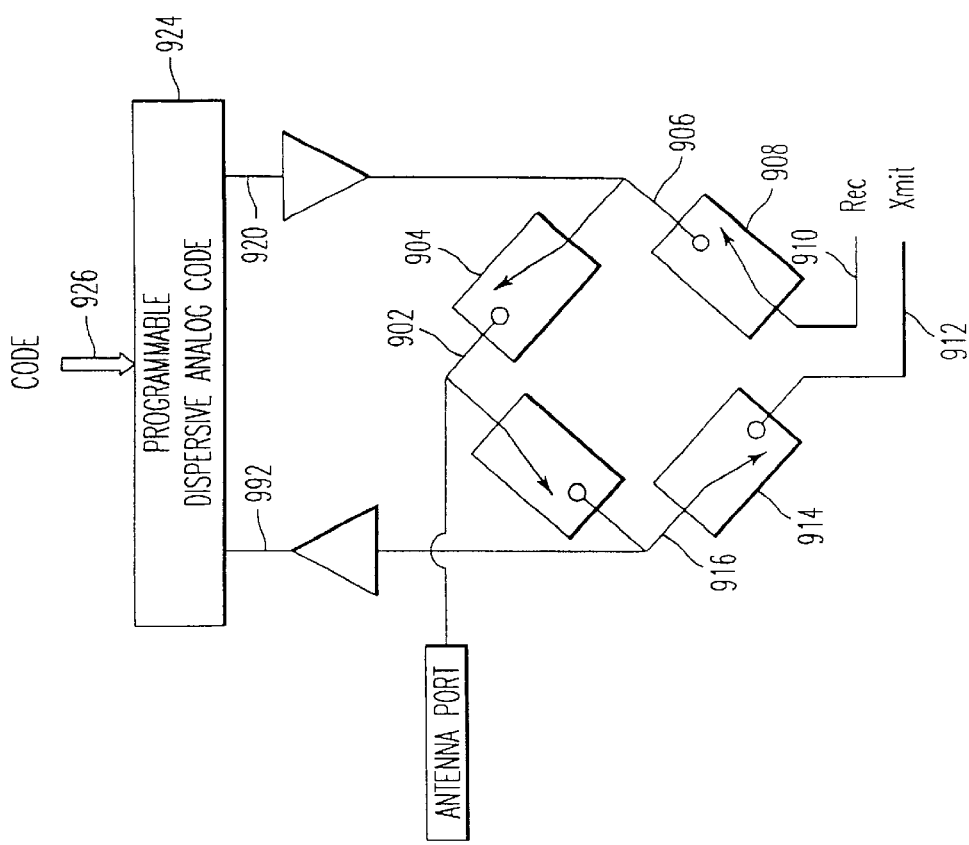
FIG. 9 shows an embodiment for switching a common antenna between the transmitter and the receiver, and sharing the same dispersive analog code hardware, even when the dispersive analog code construction is directional.
Figure 25:
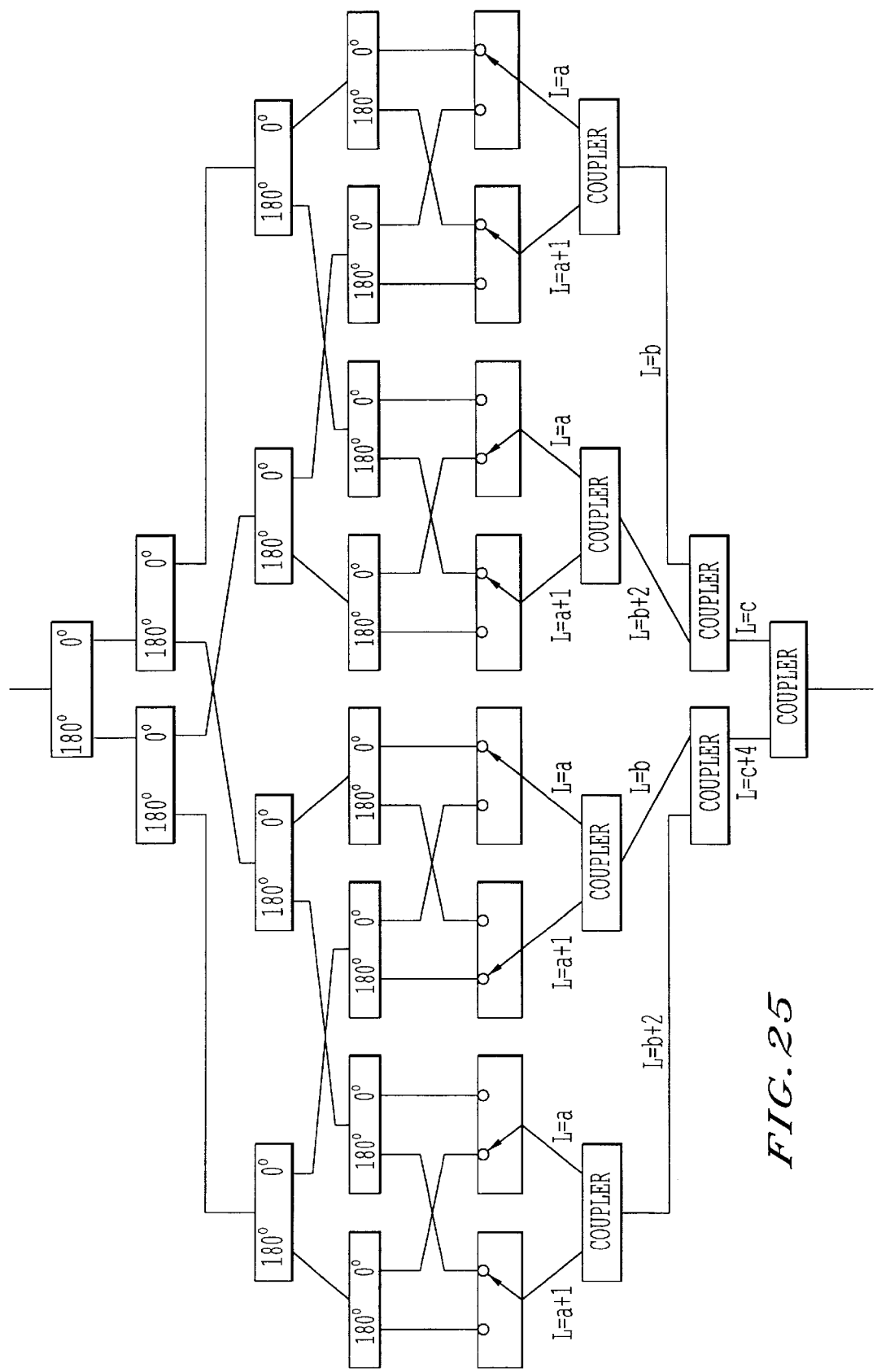
FIG. 25 shows an embodiment of a programmable dispersive-analog-code using couplers and a lattice structure that allows the transmission lines to be implemented on a printed circuit board.
Figure 26:
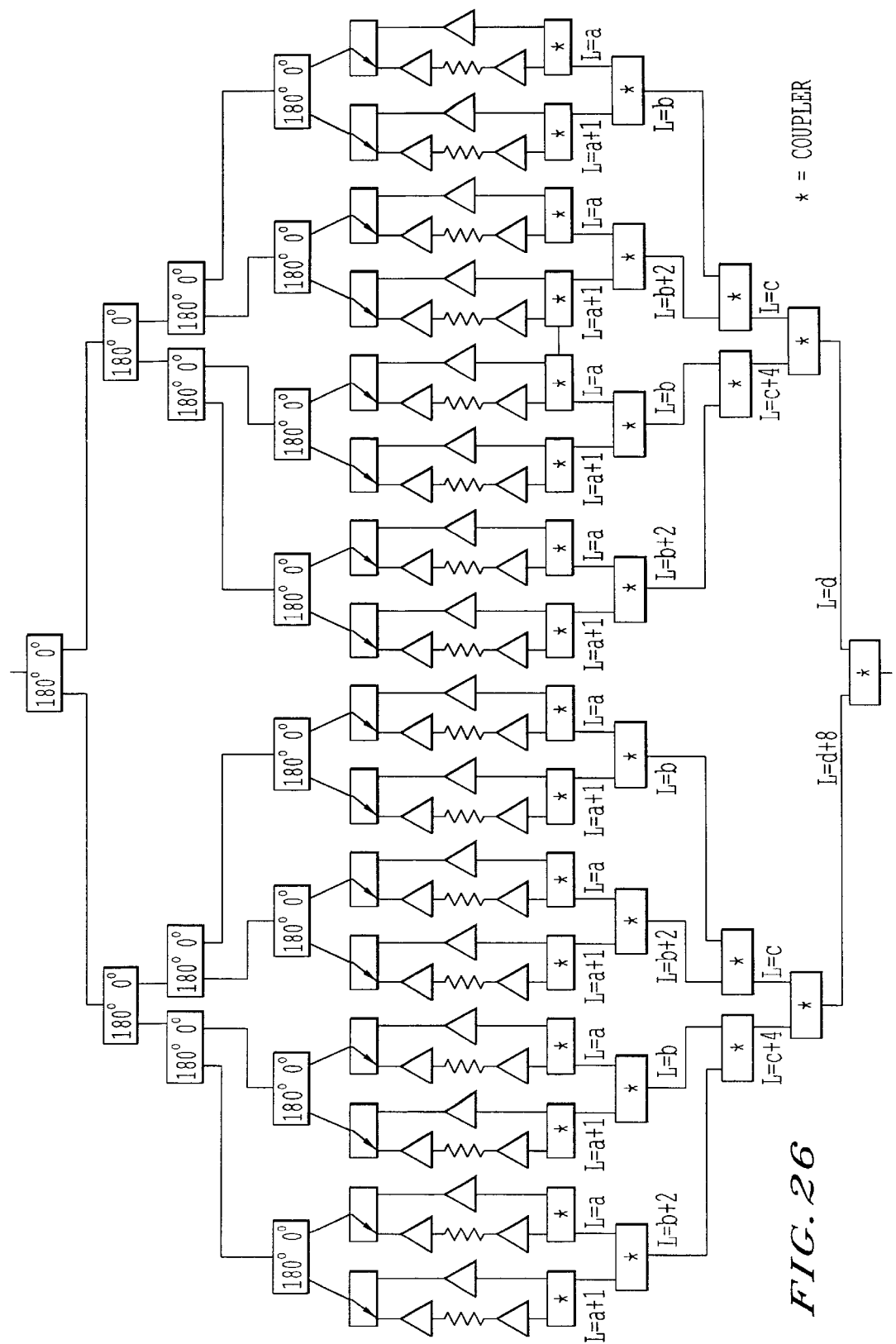
FIG. 26 shows an embodiment of a programmable dispersive-analog-code using inverting amplifiers instead of a hybrid coupler to obtain programmable polarity.
Figure 27:
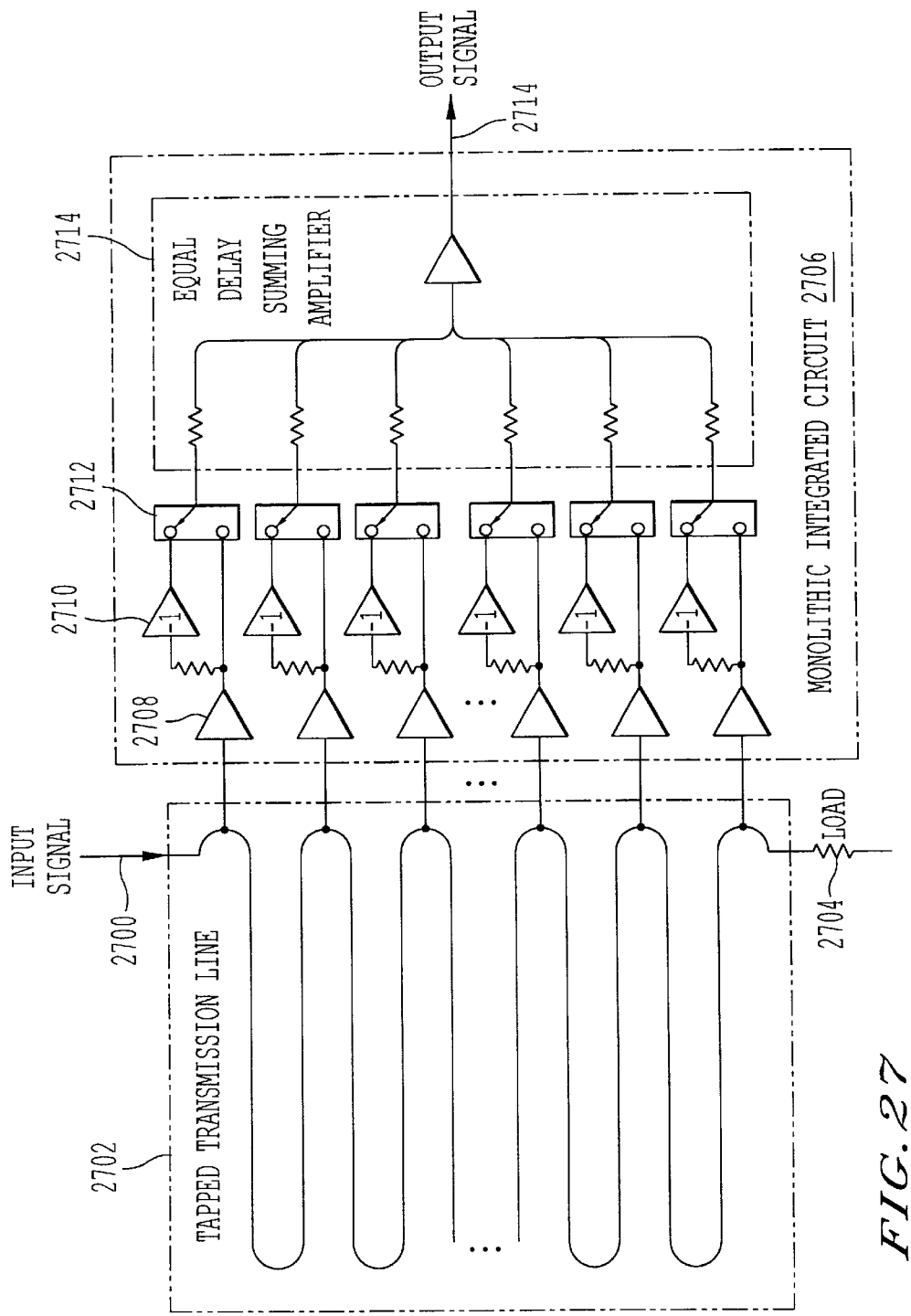
FIG. 27 shows an embodiment of a programmable dispersive-analog-code using a tapped transmission line and an active network suitable for integrating in a monolithic integrated circuit.
Figure 30:
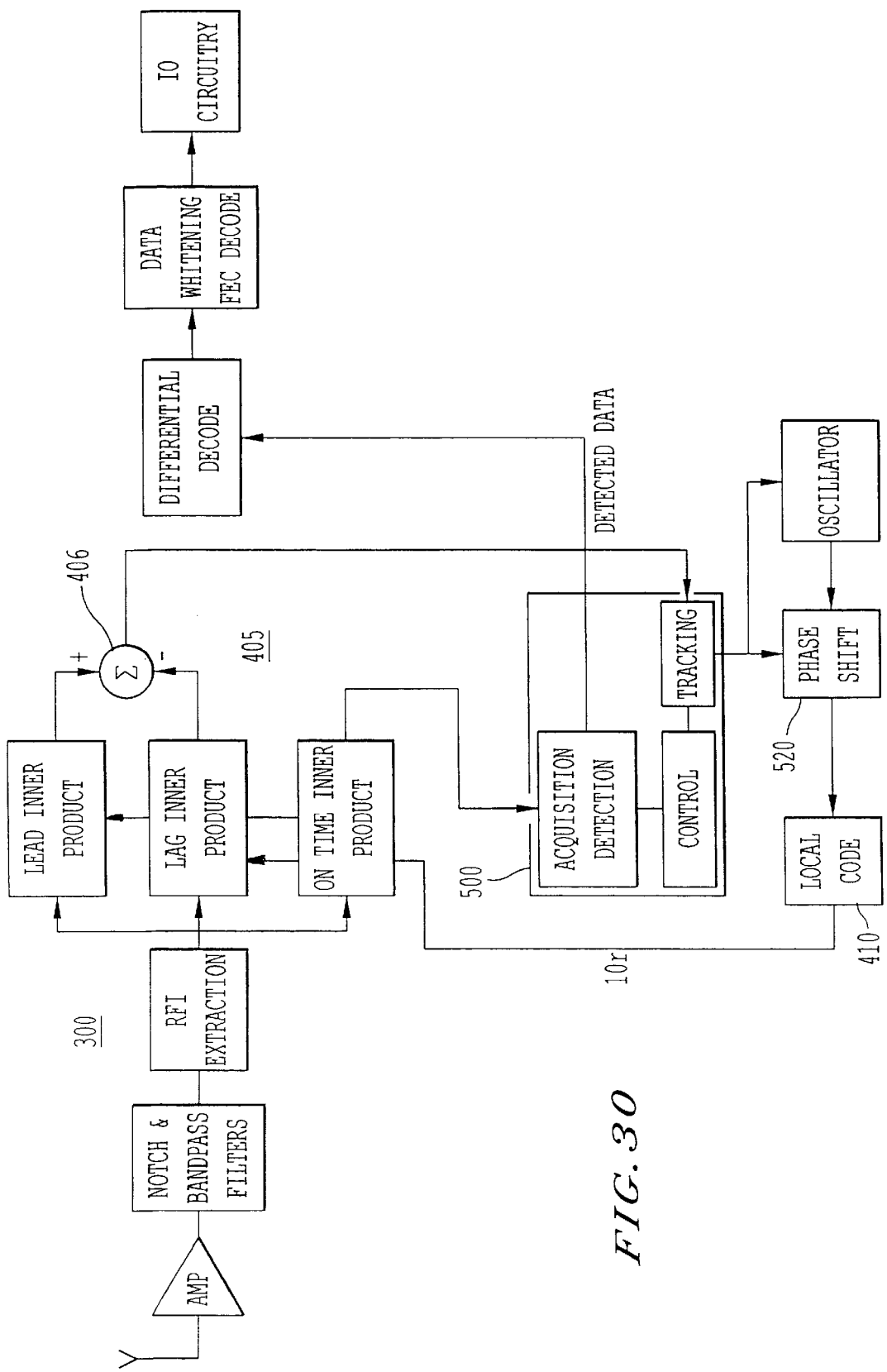
FIG. 30 is an exemplary receiver circuit according to the present invention.
Figure 31:
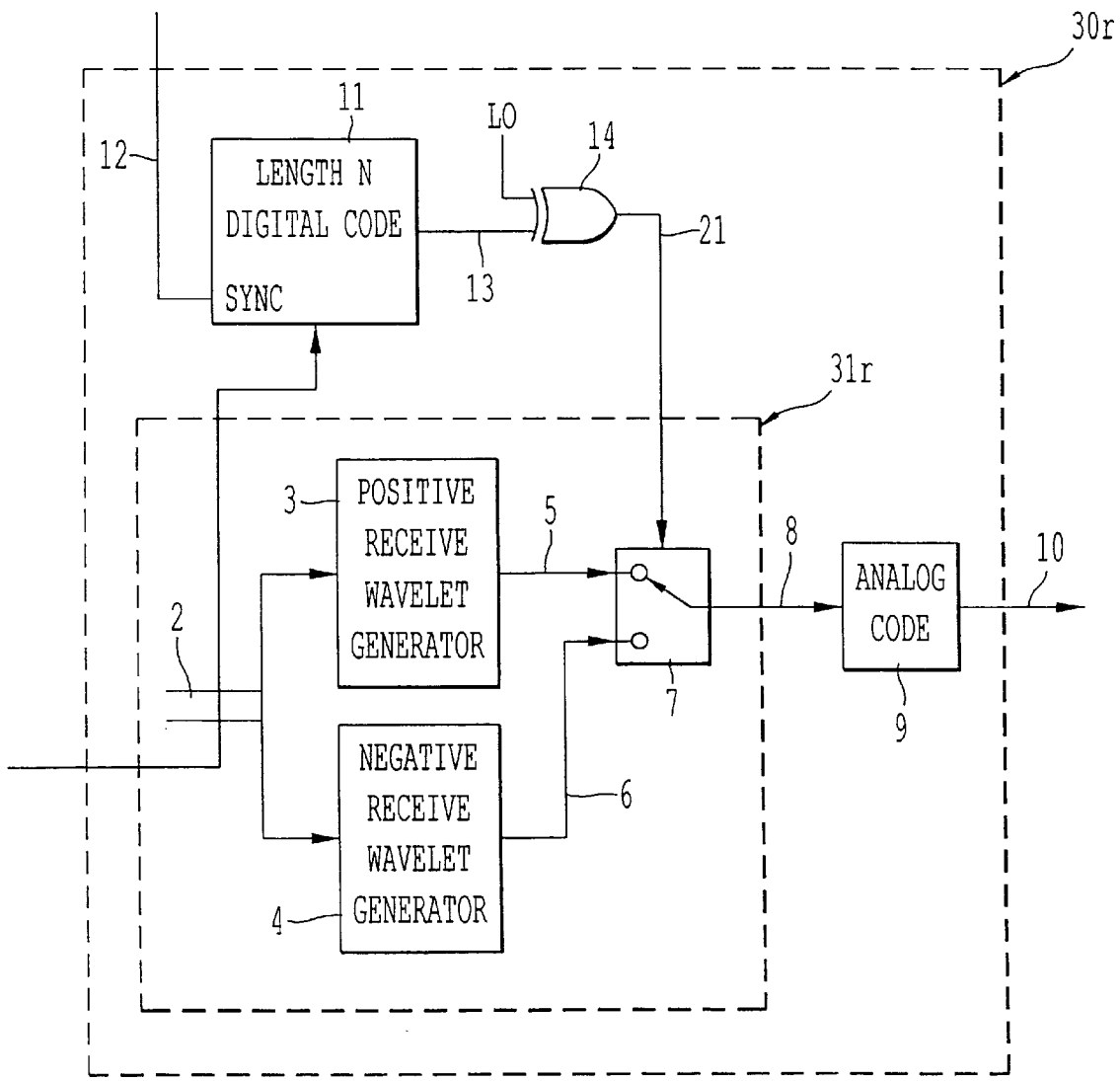
FIG. 31 is an exemplary wavelet generator circuit according to the present invention.
Figure 32:
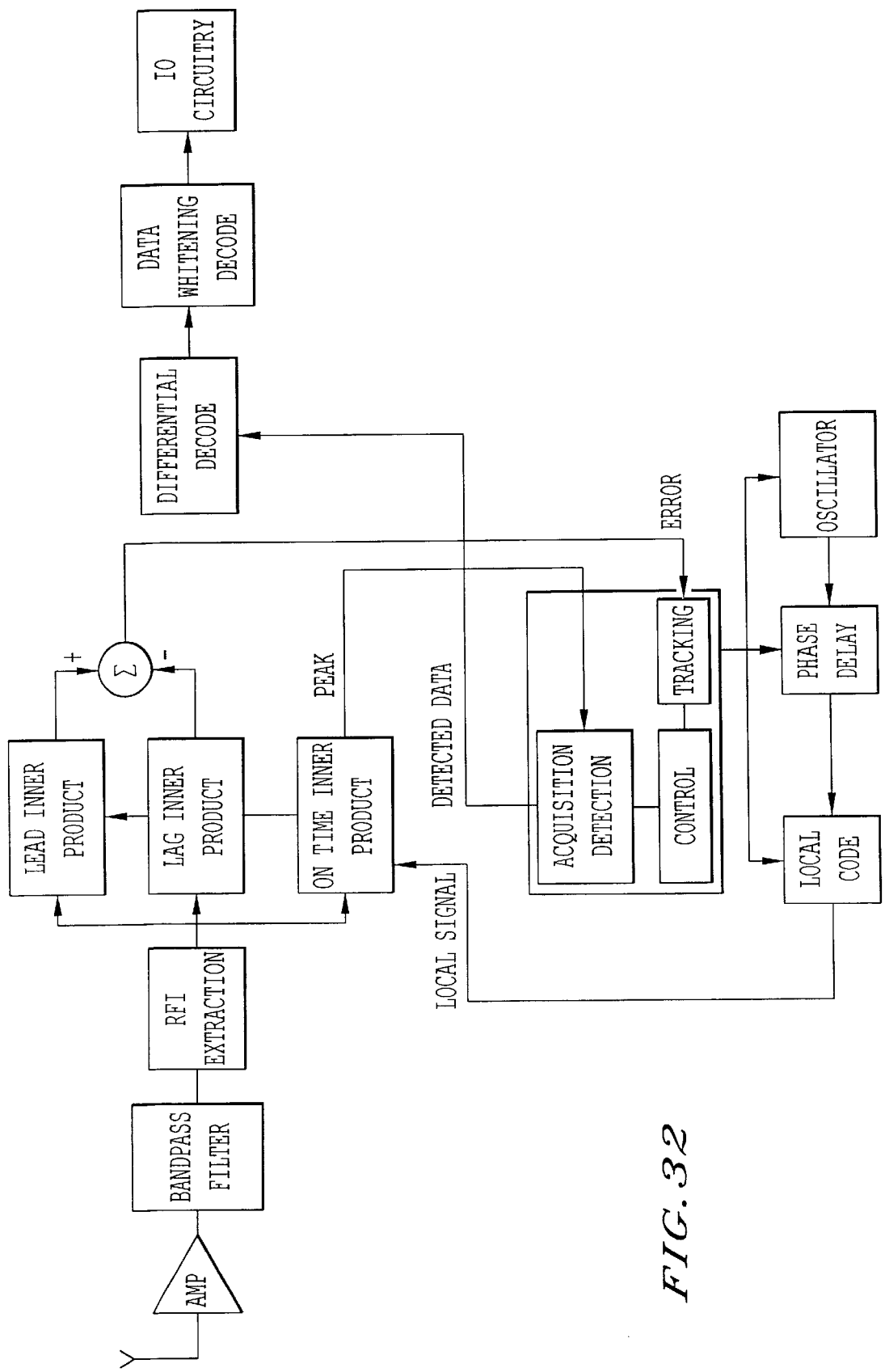
FIG. 32 is an exemplary receiver circuit according to the present invention.
Figure 33:
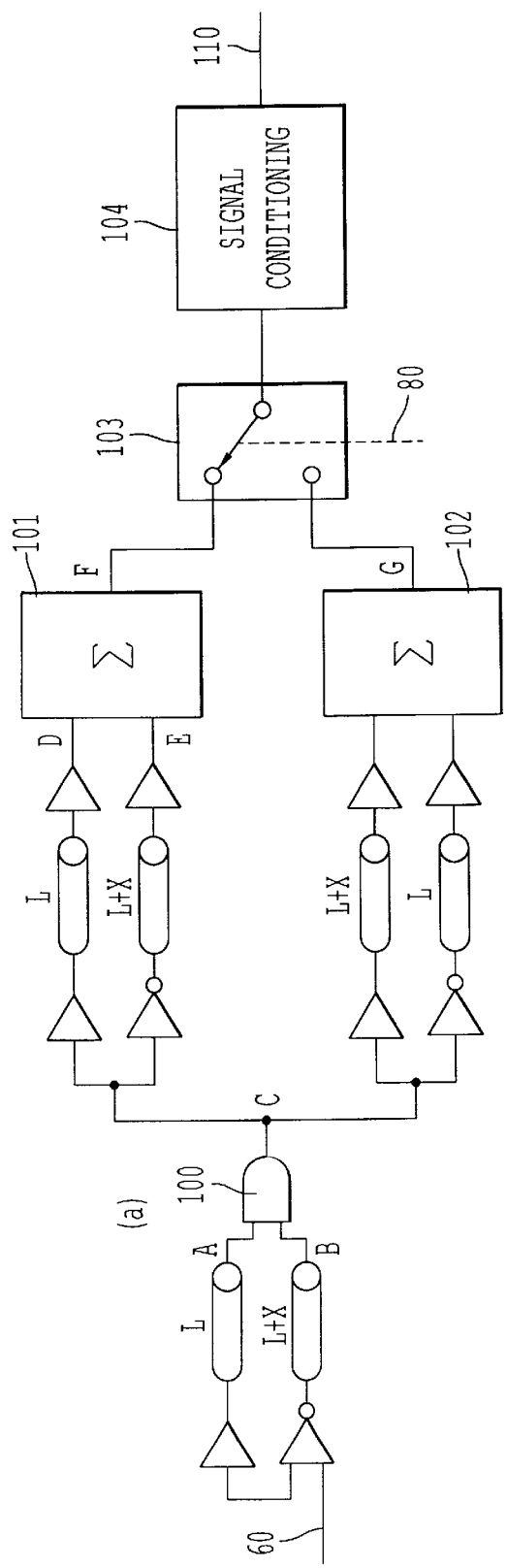
FIG. 33 is another exemplary wavelet generator circuit according to the present invention.
Figure 34:
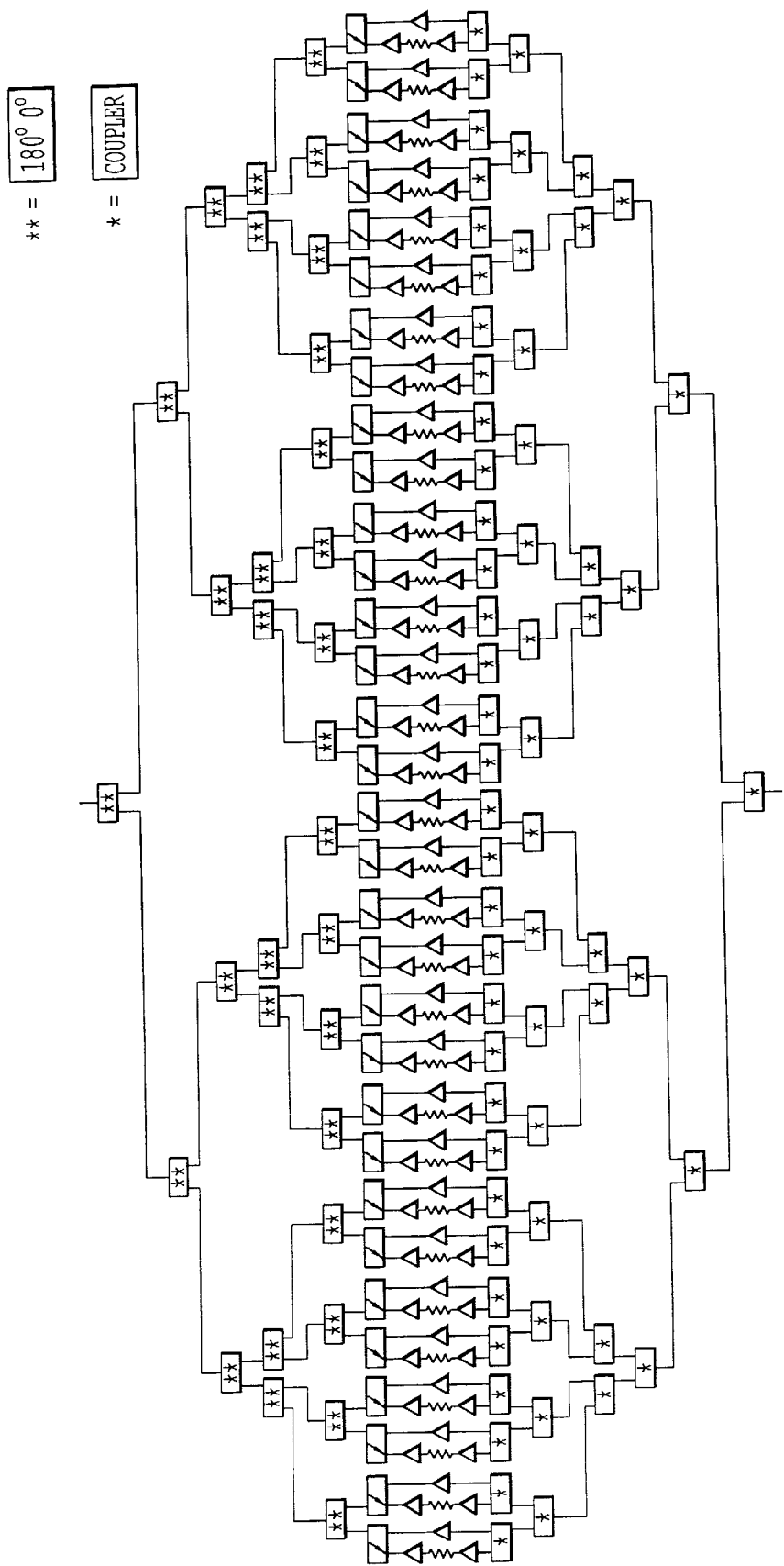
FIG. 34 shows an embodiment of a programmable dispersive-analog code generator.

FIG. 25 shows an embodiment of a programmable dispersive-analog-code using couplers and a lattice structure that allows the transmission lines to be implemented on a printed circuit board. The line lengths follow a binary length formula to minimize line lengths. FIG. 26 shows an embodiment of a programmable dispersive-analog-code using inverting amplifiers instead of a hybrid coupler to obtain programmable polarity. FIG. 30 shows an embodiment of a programmable dispersive-analog-code using a tapped transmission line and an active network suitable for integrating in a monolithic integrated circuit. FIG. 9 shows an embodiment for switching a common antenna between the transmitter and the receiver, and sharing the same dispersive analog code hardware, even when the dispersive analog code construction is directional. This feature is important when amplifiers are buried in the structure of the programmable dispersive-analog-code.

Receiver

Figure 2A:
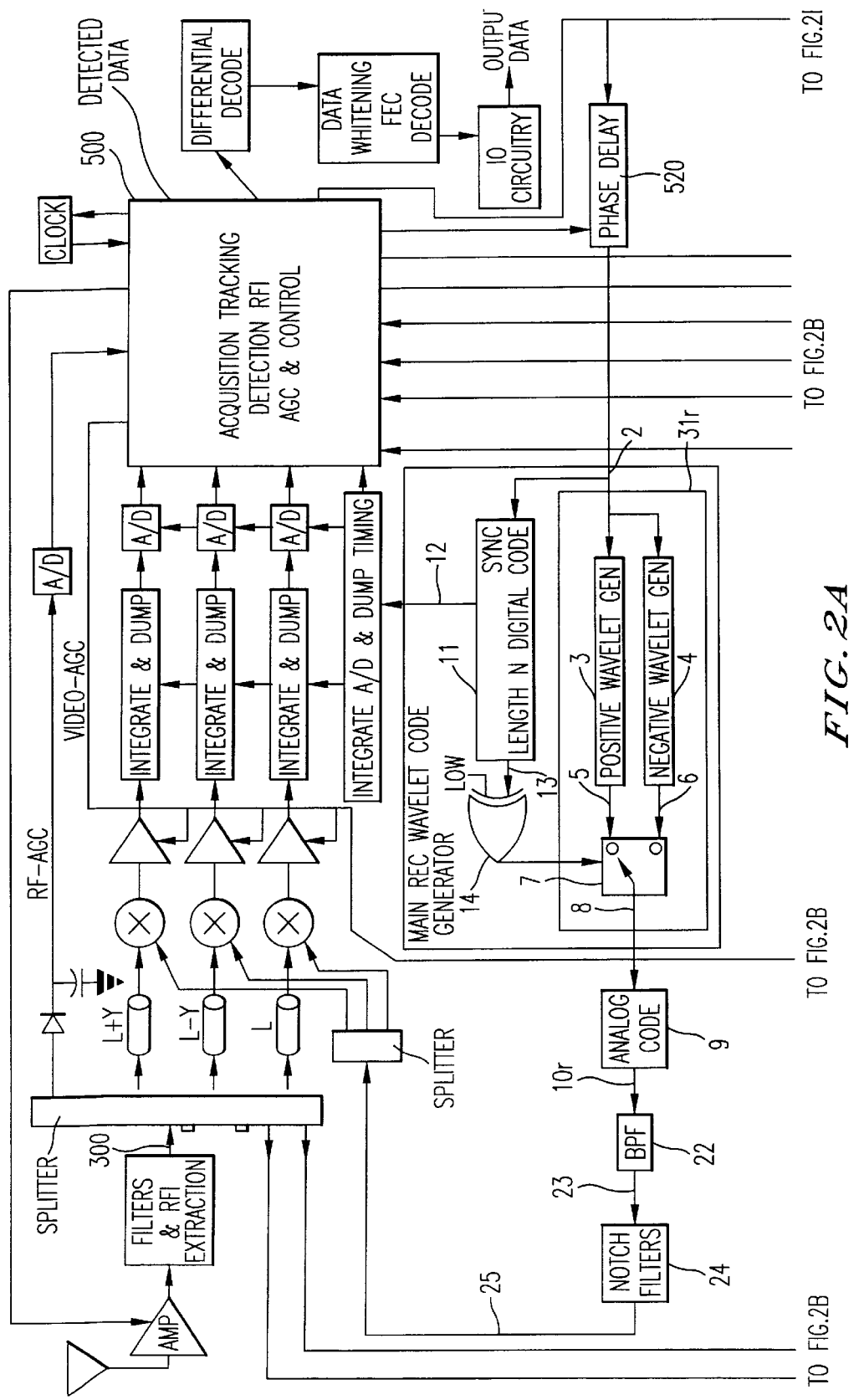
Figure 2B:
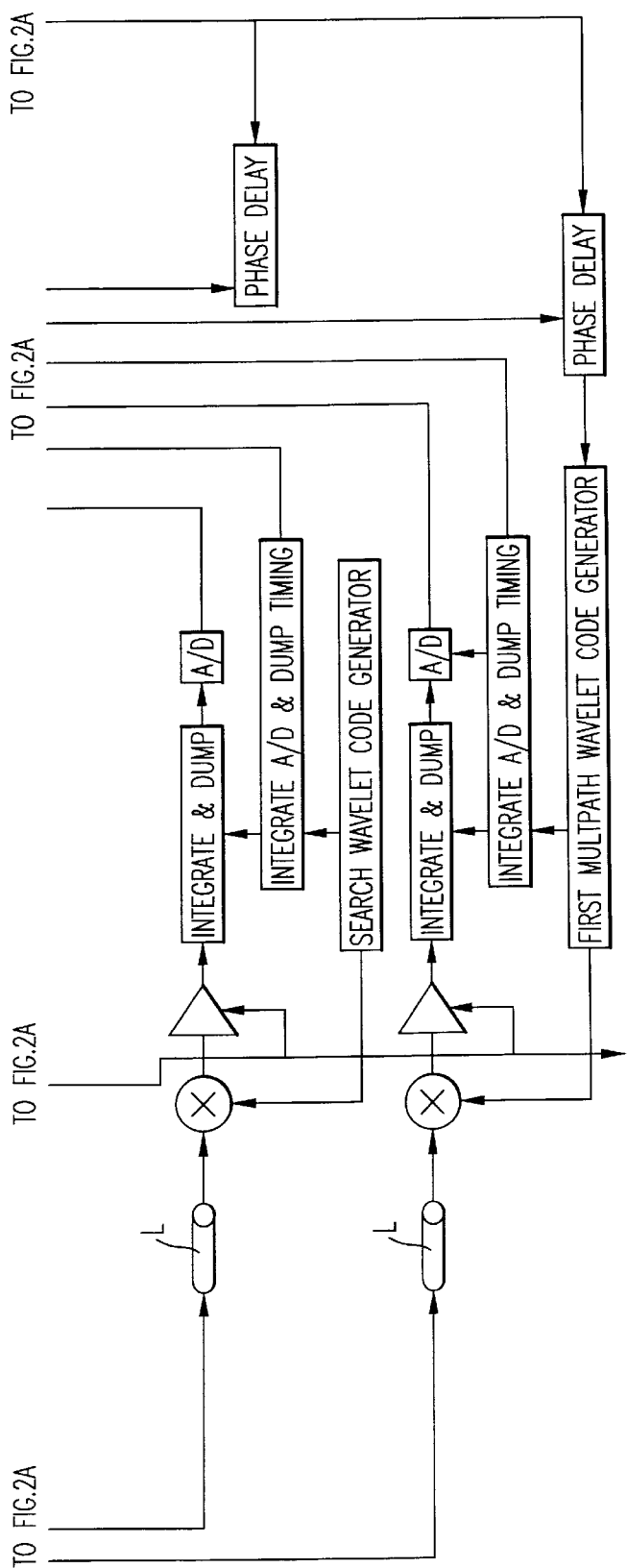
Figure 29A:
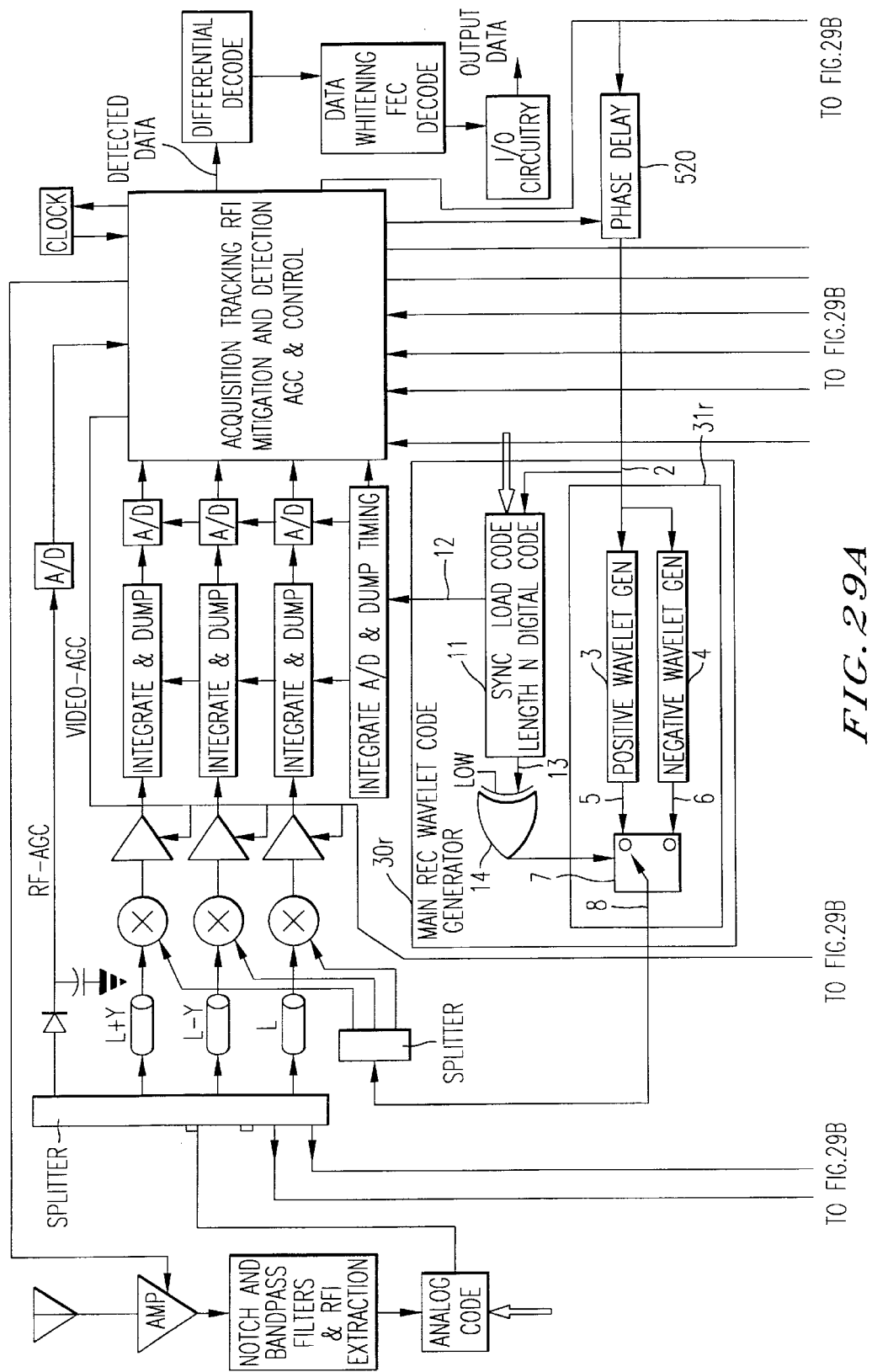
FIGS. 29A–29B show an alternative block diagram for the receiver, differing from that of FIGS. 2A–2B in that the dispersive analog code is in the path of the signal as opposed to the mixer "local-oscillator" path.
Figure 29B:
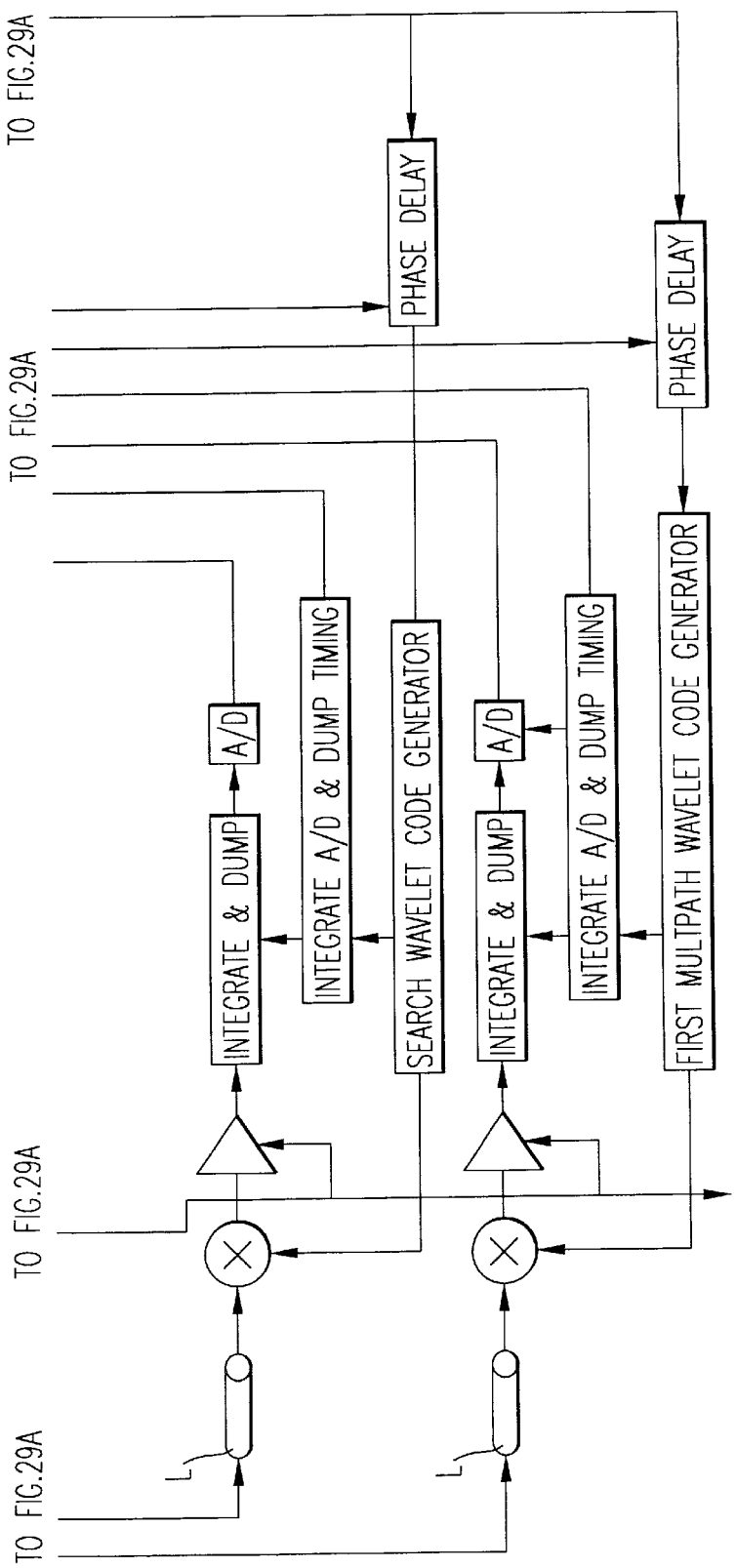

The receiver implements a sliding correlator delay locked loop specialized to short pulse waveforms, as illustrated in the block level diagrams of FIGS. 2A–2B and FIGS. 29A–29B. The difference between the two is where the analog code is inserted. In FIGS. 2A–2B, the analog code affects the wavelet sequence going into the "lo-port" of the mixer/multiplier correlators. In FIGS. 29A–29B the analog code is used as a compressive matched filter. Whereas the analog code in the transmitter spreads a single pulse to a sequence of pulses, the receive analog code does the reverse, and compresses the sequence of pulses back into a single pulse.

The receiver has two main operating modes (1) acquisition and (2) tracking and detection. Below is a description of the sliding correlator DLL implemented in the present system. The appendix contains detailed schematics of the acquisition, tracking, and detection circuits.

Receiver Input Stage

Figure 13:
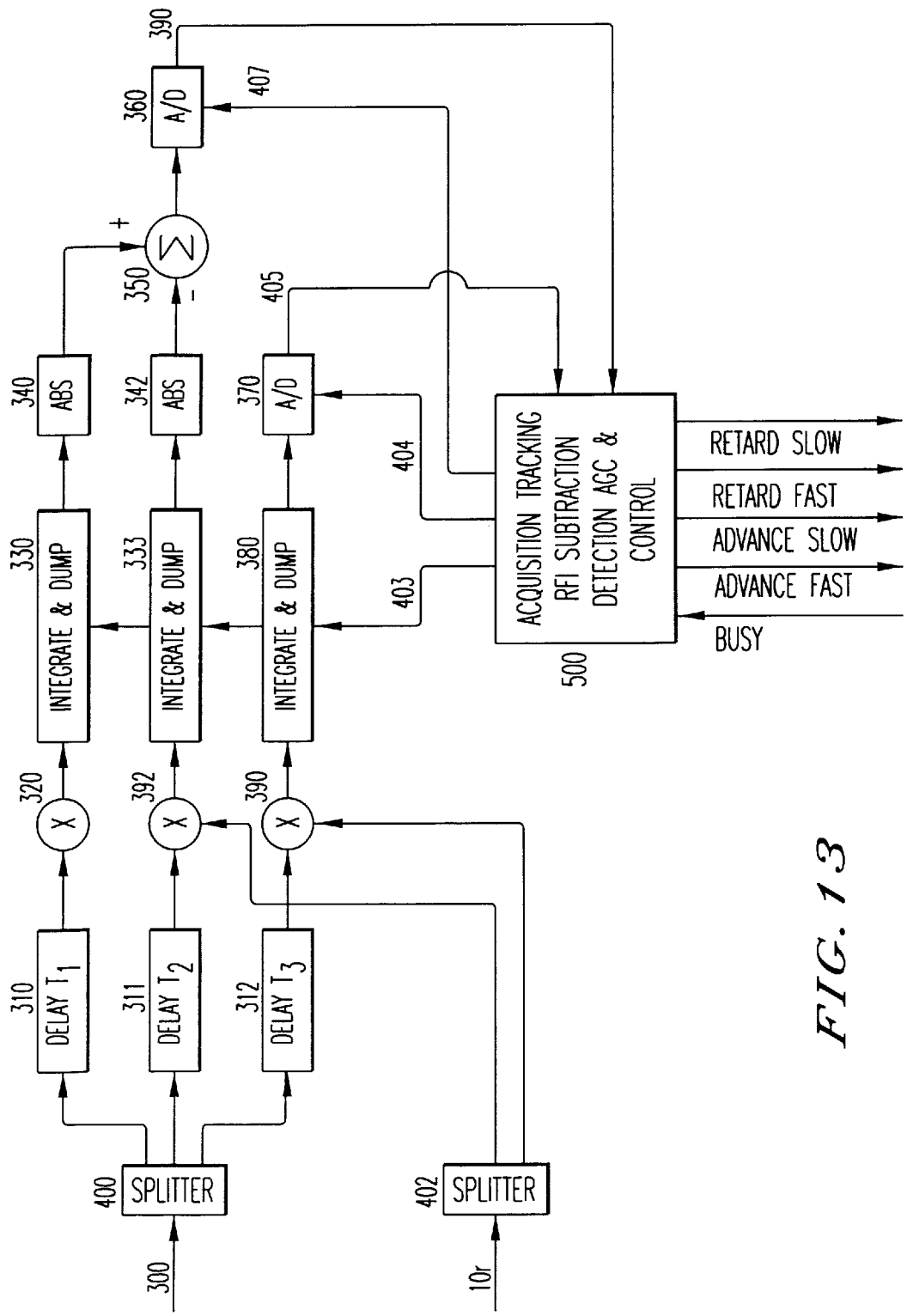
FIG. 13. shows an expansion of the delayed locked loop receiver

FIG. 13 is a more detailed block level diagram of the delay locked loop (DLL) circuit employed in the present system. After amplification, filtering, and optional RFI extraction, the received signal is input to the DLL on line 300. Splitter 400 separates the received signal into three copies, which are each delayed a different amount. The prototype uses line lengths of L+Y, L−Y, and L, to form lead, lag and on-time signals for the DLL. These line length differences lead to time delays that, during acquisition, are selected to place the on-time signal at the maximum of the pulse code autocorrelation function, and the lead and lag terms symmetrically before and after it.

What might be referred to as the "local oscillator" is, in this case, the code of receive wavelets on line 10r. Unique to the UWB high-speed communications system, this signal is different from the transmit waveform to account for the transmission effects of the antennas. It is generated similarly to the transmit system, except the data line is driven to a logic low state. To improve noise discrimination, bandpass and notch filtering consistent with any applied by the transmitter can also be applied to signal 10r. The effect is to improve the match of the filter.

Similar to the received signal, the local code on 10r is split into three copies by 402, however, here the line lengths and path delays are kept identical to the mixers 320, 390, and 392. The reason for this is to allow the lead, lag, and ontime inner products formed by the mixers and gated integrators to all operate with the same control signals.

Acquisition Process

Figure 28:
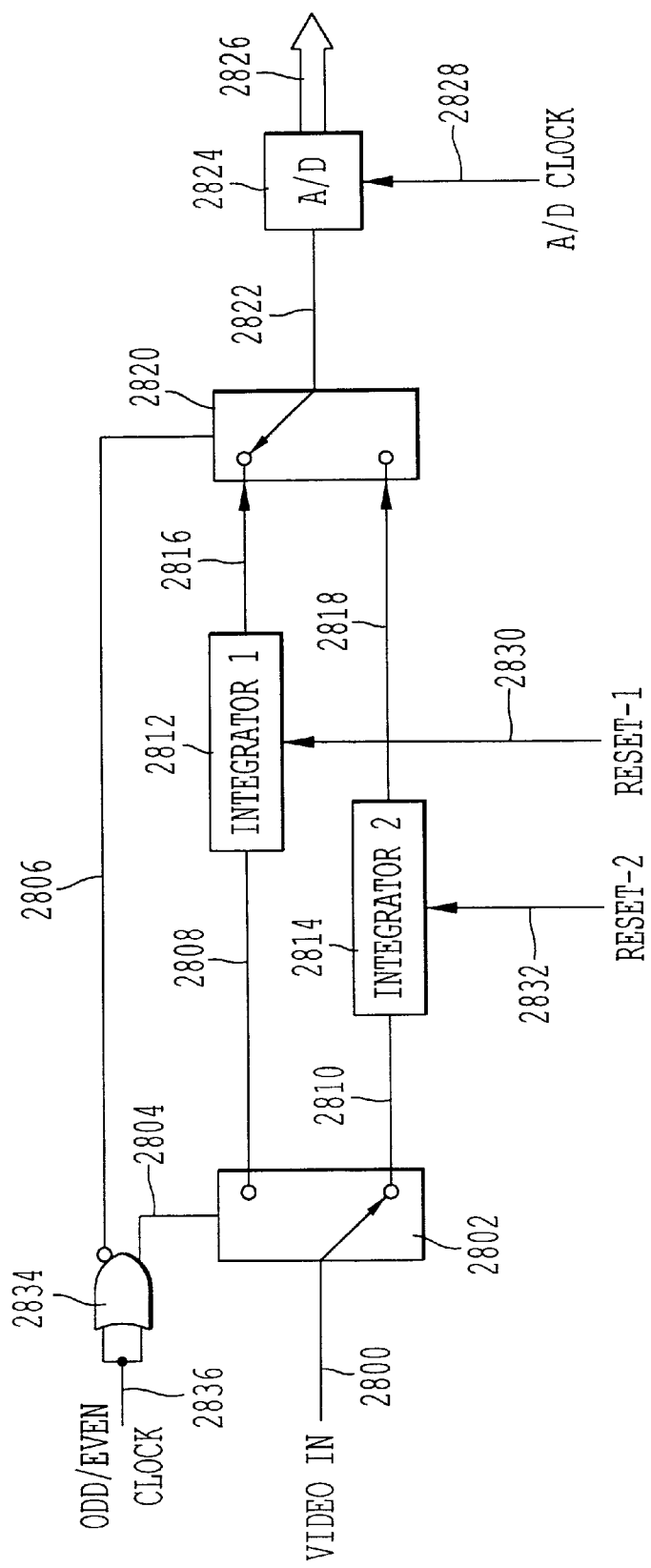
FIG. 28 shows a block diagram of an embodiment for a continuous-time integrator.

The acquisition process amounts to finding the time delay that maximizes the inner product of the ontime signal and the local code. Received signal 300 is delayed through 312, the ontime delay, and input to the RF port of mixer 390, while the local code is applied to the LO port of the mixer. The resulting product is the on-time IF signal input to gated integrator 380. Integrate control signal 403 to the integrator is synchronized by controller 500 such that the integration begins when the local code arrives at the integrator input. When the local code ends, controller 500 issues an encode command to analog to digital converter 370 on control line 404. This completes the formation of the inner product, whose value is now present on digital lines 405. The dump signal to integrator 380 is activated by controller 500, clearing the integrated value and preparing the integrator for the next inner product. The gated integrators may be constructed using a ping-pong technique to allow continuous time gated integration. FIG. 28 is a block diagram showing an implementation of a continuous time integrator.

The digitized value of the on-time inner product is input to controller 500 on lines 405. At the beginning of the acquisition process, the controller stores this value. The controller then issues an advance command to phase delay circuit 520, and increments its count of the number of advances that have been applied. It also stores the number of advances that correspond to the inner product just collected.

Figure 14:
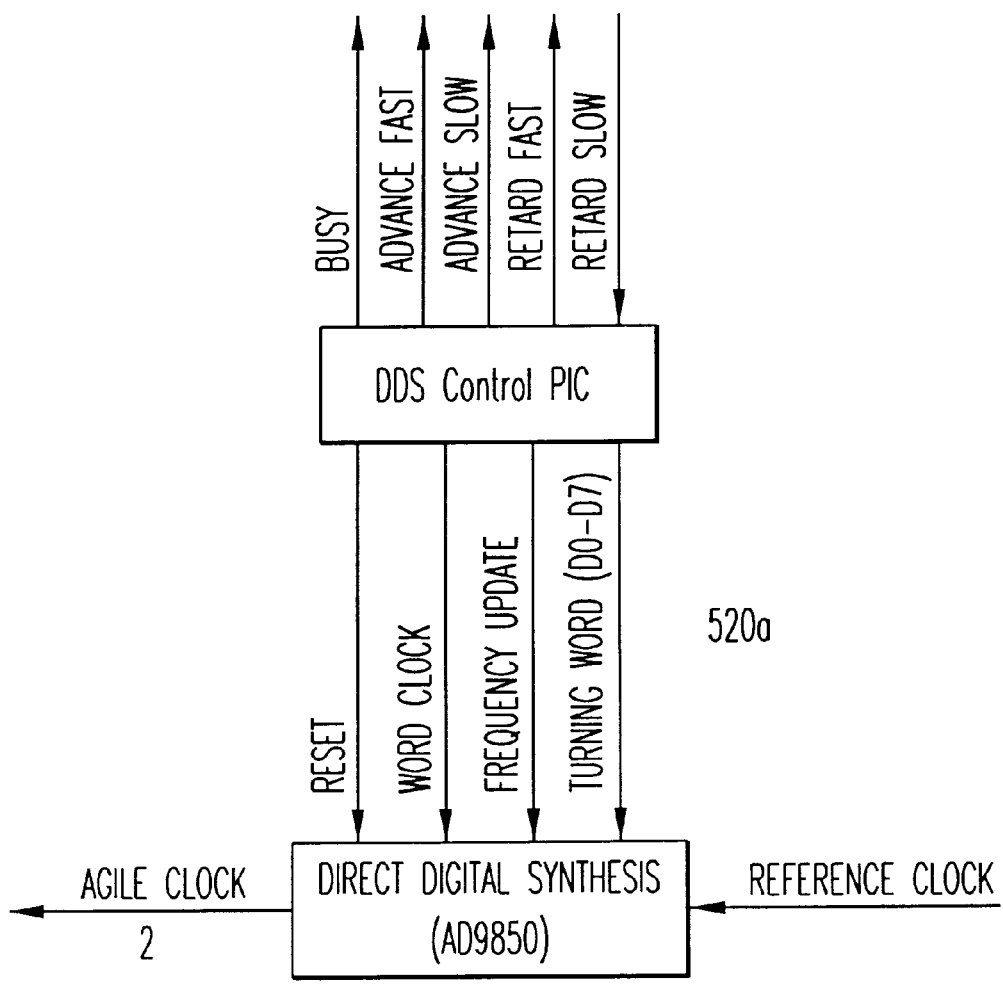
FIG. 14. shows a block diagram of an embodiment of the programmable delay (or phase shift) function, using a DDS (Direct Digital Synthesizer).
Figure 15:
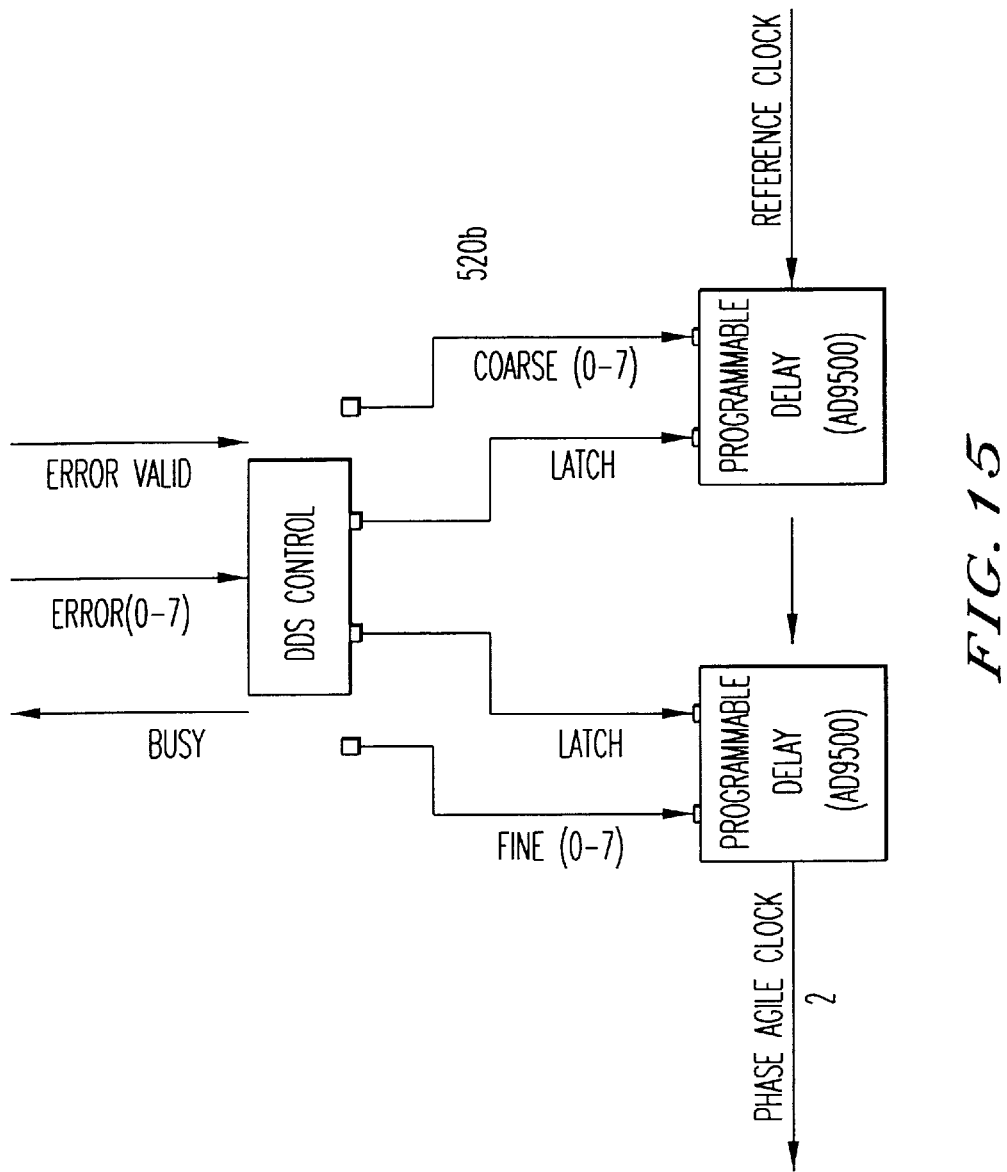
FIG. 15. shows a block diagram for a programmable delay embodiment using concatenated programmable one-shots.

The effect of delay circuit 520 is to slide, in time, the local code relative to the received signal. FIG. 14 and FIG. 15 give block level diagrams of circuits capable of sliding the clock. The circuit of FIG. 14 operates by increasing or decreasing the frequency of the reference oscillator a short time in order to slide the phase of the clock. FIG. 15 operates by directly programming a delay term. Both change the start time of the codes generated by circuits implementing FIG. 12.

Controller 500 continues to advance the phase and collect inner products, and their associated advance counts, for the on-time term. Each inner product formed is compared against the last stored. If it is greater, it replaces it, and its advance count is noted. When the total amount of time the local code has been slid equals the duration of a single code, we say the code wheel has been turned. After some number of turns of the code wheel, the acquisition process is halted. The unknown phase between the transmitter and receiver oscillators and codes is taken to be the delay of the maximum on-time inner product found. At this point the system switches to a tracking and detection mode.

Tracking & Detection Process

Lead and lag inner products, similar to the ontime term, are formed by delays 310 and 311, and mixers 320 and 392 respectively. Blocks 330 and 333 complete the integration of these terms. These are synchronized with the local code by controller 500 in the same manner as the ontime term. After the inner products have been formed, circuits 340 and 342 take their absolute value. The difference of these terms is formed by summer 350, and is digitized by analog to digital convert 360 on encode command 407 from the controller. The timing of the encode command is such that the difference of the lead and lag inner products has had sufficient time to propagate through to the A/D.

The lead and lag terms are formed at symmetric time delays before and after the ontime term. Because the correlation function is also symmetric, these values will be equal when the local code is synchronized with the received signal. If the controller detects a non-zero value it will advance or retard the phase in order to zero the error. As a means of improving the signal to noise ratio of the error term, many of these may be summed together before making an advance or retard decision.

Detection is performed by a window comparison on the ontime inner product. Values greater than zero map to a one, those less than zero map to a zero. An erasure zone may be added as well. The detected data is differentially decoded, whitening decoded, and forward error corrected.

Referring to FIGS. 2A–2B, a "search" channel, shown blocks 262 through 270, is used to continually scan for multipath signals which may be stronger than the one (or several) being used. In the event that a stronger correlation peak is found by 234, then the main channel, or an auxiliary rake channel, can be moved to track the larger peak via phase delay 241 or 280. This operation allows the system to operate in dynamic multipath conditions.

A first rake channel, shown in blocks 280 through 297 is used to track the second strongest signal so that the next strongest correlation can be added to the main channel signal. This summation is the first term in a time domain RAKE filter that takes advantage of multipath to improve the BER performance. Although FIGS. 2A–2B show only one rake channel, it is the intent that several rake channels would operate simultaneously.

What is claimed is:

1. A data communications method, comprising:

processing high-speed digital data for communication to produce processed data;

generating short impulse wavelets;

constructing a digitally modulated ultra wideband signal from the short impulse wavelets in response to bits of the processed data, wherein the digitally modulated ultra wideband signal comprises a series of the short impulse wavelets, and the value of each bit of the processed data is digitally modulated onto the shape of at least one of the short impulse wavelets of the series, to produce a series of digitally shape modulated impulse wavelets; and transmitting the digitally modulated ultra wideband signal, including the series of digitally shape modulated impulse wavelets.

2. The method of claim 1, wherein each short impulse wavelet of the series has a duration of between 100 and 1000 picoseconds.

3. The method of claim 1, wherein the step of processing comprises:

receiving high-speed digital data as input data;

encoding the input data for forward error correction (FEC); and differentially encoding the FEC encoded data.

4. The method of claim 3, wherein the step of processing further comprises:

repetitively generating a codeword to produce a digital code signal; and digitally modulating the digital code signal with bits of data from the differentially encoding step, to generate the processed data.

5. The method of claim 1, wherein the value of each bit of the processed data is biphase modulated onto the shape of said at least one of the short impulse wavelets of the series.

6. The method of claim 1, wherein:
the step of generating comprises generating first short impulse wavelets of a first predetermined shape, and generating second short impulse wavelets having a second predetermined shape; and
the step of constructing comprising selecting between one or more of the first short impulse wavelets and one or more of the second short impulse wavelets, in response to the value of each bit of the processed data.

7. The method as in claim 6, wherein the second predetermined shape is an inverse of the first predetermined shape.

8. The method as in claim 1, wherein the step of processing comprises:
repetitively generating a codeword to produce a digital code signal; and
digitally modulating the digital code signal in accord with bits obtained from the processed high-speed data, to produce the processed data.

9. The method as in claim 8, wherein the step of digitally modulating the digital code signal comprises modulating each instance of the codeword in the digital codeword with one of the bits obtained from the processed data.

10. The method as in claim 1, wherein the step of transmitting comprises:
analog modulating each impulse wavelet in the series of digitally shape modulated impulse wavelets in accord with a code; and
transmitting the analog modulated signal.

11. The method as in claim 1, wherein responsive to each respective modulated short impulse wavelet of the series, the step of transmitting comprises:
generating a plurality of time offset replicas of the respective impulse wavelet;
combining the modulated time offset replicas, in accord with a code, to form coded a group of impulse wavelets derived from the respective impulse wavelet; and
transmitting groups of impulse wavelets derived from the respective impulse wavelets in series.

12. The method as in claim 1, wherein the step of transmitting comprises transmitting a carrierless baseband signal containing the digitally modulated ultra wideband signal.

13. The method as in claim 1, further comprising:
receiving the digitally modulated ultra wideband signal; and
demodulating the series of digitally shape modulated impulse wavelets to recover the high-speed digital data.

14. A data communications method, comprising:
processing high-speed digital data for communication;
repetitively generating a codeword to produce a digital code signal; and
digitally modulating the digital code signal with bits of data obtained from the high-speed digital data, to produce a modulated code signal;
generating short impulse wavelets;
constructing a digitally modulated ultra wideband signal from the short impulse wavelets in response to bits of the modulated code signal, wherein the digitally modulated ultra wideband signal comprises a series of the short impulse wavelets, and the value of each bit of the modulated code signal is digitally modulated onto the shape of at least one of the short impulse wavelets of the series;
responsive to each respective modulated short impulse wavelet of the series, the step of transmitting comprises:
(a) generating a plurality of time offset replicas of the respective impulse wavelet, and
(b) combining the modulated time offset replicas, in accord with a code, to form a coded group of impulse wavelets derived from the respective impulse wavelet; and
transmitting groups of impulse wavelets derived from the respective impulse wavelets in series.

15. The method of claim 14, wherein the step of processing comprises:
receiving high-speed digital data as input data;
encoding the input data for forward error correction (FEC); and
differentially encoding the FEC encoded data.

16. The method of claim 14, wherein the value of each bit of the modulated code signal is biphase modulated onto the shape of said at least one of the short impulse wavelets of the series.

17. The method of claim 16, wherein:
the step of generating the impulse wavelets comprises: generating first short impulse wavelets of a first predetermined shape, and generating second short impulse wavelets having a second predetermined shape; and
the step of constructing comprises selecting between one or more of the first short impulse wavelets and one or more of the second short impulse wavelets, in response to the value of each bit of the modulated code signal.

18. The method as in claim 17, wherein the second predetermined shape is an inverse of the first predetermined shape.

19. A data transmitter, comprising:
at least one encoder for processing high-speed digital data to produce processed data;
at least one wavelet generator for generating short impulse wavelets;
means for constructing a digitally modulated ultra wideband signal from the short impulse wavelets in response to bits of the processed data from the at least one encoder, wherein the digitally modulated ultra wideband signal comprises a series of the short impulse wavelets, and the value of each of said bits is digitally modulated onto the shape of at least one of the short impulse wavelets of the series, to produce a series of digitally shape modulated impulse wavelets; and
an output for transmitting the digitally modulated ultra wideband signal, including the series of digitally shape modulated impulse wavelets.

20. The data transmitter as in claim 19, wherein the at least one encoder comprises:
a forward error correction (FEC) encoder, for FEC encoding of the high-speed data; and
a differential encoder coupled to the FEC encoder for differentially encoding the FEC encoded data.

21. The data transmitter as in claim 20, wherein the at least one encoder further comprises:
a chip code generator for repetitively outputting a codeword, to form a cyclical chip code sequence; and
a code modulator responsive to an output of the differential encoder and an output of the chip code generator, for digitally modulating the chip code sequence with bits of differentially encoded data, to form the processed data.

22. The data transmitter as in claim 21, further comprising:
a code modulator coupled between the output and the means for constructing, wherein the code modulator generates a plurality of time offset replicas of each respective modulated short impulse wavelet of the series, and modulates and combines the time offset replicas of each respective impulse wavelet in accord with a code, to form coded groups of impulse wavelets for the ultra wideband signal transmitted from the output.

23. The data transmitter as in claim 19, further comprising:
a code modulator coupled between the output and the means for constructing,
wherein the code modulator generates a plurality of time offset replicas of each respective modulated short impulse wavelet of the series, and modulates and combines the time offset replicas of each respective impulse wavelet in accord with a code, to form coded groups of impulse wavelets for the transmission.

24. The data transmitter of claim 19, further comprising:
a power amplifier, coupled to the output, for amplifying the digitally modulated ultra wideband signal comprising the series of digitally shape modulated impulse wavelets; and
an antenna coupled to an output of the amplifier for transmitting the digitally modulated ultra wideband signal comprising the series of digitally shape modulated impulse wavelets over a wireless link.

25. The data transmitter of claim 19, wherein the at least one wavelet generator is adapted to generate short impulse wavelets of duration between 100 and 1000 picoseconds.

26. The data transmitter of claim 19, wherein the at least one wavelet generator comprises:
a first wavelet generator for generating first short impulse wavelets having a first predetermined shape, and
a second wavelet generator for generating second short impulse wavelets having a second predetermined shape;
wherein the means for constructing comprises a selector for selecting between one or more of the first short impulse wavelets and one or more of the second short impulse wavelets, in response to the value of each bit of the processed data from the at least one encoder.

27. The data transmitter of claim 26, wherein the second wavelet generator generates second short impulse wavelets having a shape corresponding to an inverse of the first predetermined shape.

28. A data transmitter, comprising:
at least one encoder for processing high-speed digital data for transmission;
at least one wavelet generator for generating first short impulse wavelets having a first predetermined shape, and for generating second short impulse wavelets having a second predetermined shape;
a selector responsive to bits of the processed high-speed data for selecting between one or more of the first short impulse wavelets and one or more of the second short impulse wavelets, in response to the value of each bit of the processed high-speed data, to form a digitally modulated ultra wideband signal comprising a series of the short impulse wavelets having the first and second shapes; and
an output for transmitting the digitally modulated ultra wideband signal to a remote device.

29. A data transmitter, comprising:
at least one encoder for processing high-speed digital data, the at least one encoder comprising:
a) a chip code generator for repetitively outputting a codeword, to form a cyclical chip code sequence, and
b) a code modulator responsive to an output of the differential encoder and an output of the chip code generator, for digitally modulating the chip code sequence with bits of differentially encoded data, to form processed high-speed data;
at least one wavelet generator, for generating first short impulse wavelets having a first predetermined shape, and for generating second short impulse wavelets having a second predetermined shape;
a selector responsive to bits of the processed high-speed data for selecting between one or more of the first short impulse wavelets and one or more of the second short impulse wavelets, in response to the value of each bit of the processed high-speed data, to form a digitally modulated ultra wideband signal comprising a series of the short impulse wavelets having the first and second shapes;
a code modulator coupled between the output of the chip code generator and the selector, wherein the code modulator generates a plurality of time offset replicas of each respective short impulse wavelet of the series, and modulates and combines the time offset replicas of each respective impulse wavelet in accord with a code, to form coded groups of impulse wavelets for transmission to a remote device.

30. A high-speed digital data communications system, comprising:
at least one encoder for processing first high-speed digital data for transmission;
at least one wavelet generator for generating short impulse wavelets;
means for constructing a digitally modulated ultra wideband signal from the short impulse wavelets in response to bits of the processed first high-speed digital data from the at least one encoder, wherein the digitally modulated ultra wideband signal comprises a series of the short impulse wavelets, and the value of each of said bits is digitally modulated onto the shape of at least one of the short impulse wavelets of the series, to produce a series of digitally shape modulated impulse wavelets;
an output for transmitting the digitally modulated ultra wideband signal, including the series of digitally shape modulated impulse wavelets to at least one remote device;
a receiver, for receiving a digitally modulated ultra wideband signal from at least one remote device; and
a demodulator coupled to the receiver for demodulating a series of digitally shape modulated impulse wavelets in the digitally modulated ultra wideband signal received from at least one remote device, to recover second high-speed digital data.

* * * * *